(12) United States Patent
Walker et al.

(10) Patent No.: US 11,630,346 B2
(45) Date of Patent: *Apr. 18, 2023

(54) BACK LIGHT UNIT FOR BACKLIT DISPLAYS

(71) Applicant: BRIGHTVIEW TECHNOLOGIES, INC., Durham, NC (US)

(72) Inventors: Kenneth L. Walker, Durham, NC (US); Bing Shen, Cary, NC (US); Matthew K. Pope, Durham, NC (US)

(73) Assignee: BRIGHTVIEW TECHNOLOGIES, INC., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,595

(22) Filed: Oct. 21, 2021

(65) Prior Publication Data

US 2022/0043307 A1 Feb. 10, 2022

Related U.S. Application Data

(63) Continuation of application No. 17/015,780, filed on Sep. 9, 2020, now Pat. No. 11,181,776.

(60) Provisional application No. 63/023,618, filed on May 12, 2020, provisional application No. 62/929,309, filed on Nov. 1, 2019, provisional application No. 62/898,693, filed on Sep. 11, 2019.

(51) Int. Cl.
*G02F 1/13357* (2006.01)
*G02F 1/1335* (2006.01)

(52) U.S. Cl.
CPC .. *G02F 1/133606* (2013.01); *G02F 1/133603* (2013.01); *G02F 1/133611* (2013.01); *G02F 1/133607* (2021.01); *G02F 1/133614* (2021.01)

(58) Field of Classification Search
CPC ......... G02F 1/133606; G02F 1/133603; G02F 1/133611; G02F 1/133614; G02F 1/133607
See application file for complete search history.

(56) References Cited

U.S. PATENT DOCUMENTS 7,190,387 B2   3/2007 Rinehart et al.
7,192,692 B2   3/2007 Wood et al.
(Continued)

FOREIGN PATENT DOCUMENTS

CN   114556201 A   5/2022
EP     4028830 A1   7/2022
(Continued)

OTHER PUBLICATIONS

International Search Report and Written Opinion received for PCT Patent Application No. PCT/US2020/049907, dated Nov. 30, 2020, 9 pages.
(Continued)

*Primary Examiner* — Mary Ellen Bowman
(74) *Attorney, Agent, or Firm* — Rauschenbach Patent Law Group, LLC; Kurt Rauschenbach

(57) ABSTRACT

A back light unit includes an array of light emitting diodes, at least two optical films positioned above the array of light emitting diodes, and a pair of brightness enhancement films positioned above the at least two optical films. A majority of the optical films are light splitting optical films having a plurality of light splitting microstructures on at least one surface thereof.

22 Claims, 22 Drawing Sheets

(56) References Cited

U.S. PATENT DOCUMENTS

| | | | |
|---|---|---|---|
| 7,867,695 B2 | 1/2011 | Freese et al. | |
| 2002/0003593 A1* | 1/2002 | Arakawa | G02B 5/3016 |
| | | | 349/96 |
| 2009/0046478 A1 | 2/2009 | Wang et al. | |
| 2010/0033957 A1 | 2/2010 | Lin | |
| 2011/0141412 A1* | 6/2011 | Lee | G02F 1/133621 |
| | | | 349/106 |
| 2017/0153383 A1* | 6/2017 | Lee | G02F 1/1323 |
| 2018/0252968 A1 | 9/2018 | Nakamura et al. | |
| 2018/0329207 A1 | 11/2018 | Sitter et al. | |
| 2021/0072598 A1 | 3/2021 | Walker et al. | |

FOREIGN PATENT DOCUMENTS

| | | |
|---|---|---|
| KR | 10-2022-0062028 A | 5/2022 |
| WO | 2019/152382 A1 | 8/2019 |
| WO | 2021/050523 A1 | 3/2021 |

OTHER PUBLICATIONS

Non-Final Office Action received for U.S. Appl. No. 17/015,780, dated Jun. 24, 2021, 6 pages.
Notice of Allowance received for U.S. Appl. No. 17/015,780, dated Sep. 8, 2021, 7 pages.
Corrected Notice of Allowance received for U.S. Appl. No. 17/015,780, dated Sep. 15, 2021, 5 pages.
Non-Final Office Action received for U.S. Appl. No. 17/015,780 dated Jun. 24, 2021, 18 pages.
Notice of Allowance received for U.S. Appl. No. 17/015,780 dated Sep. 8, 2021, 13 pages.
International Preliminary Report on Patentabillity received for PCT Application Serial No. PCT/US2020/049907 dated Mar. 24, 2022, 8 pages.

* cited by examiner

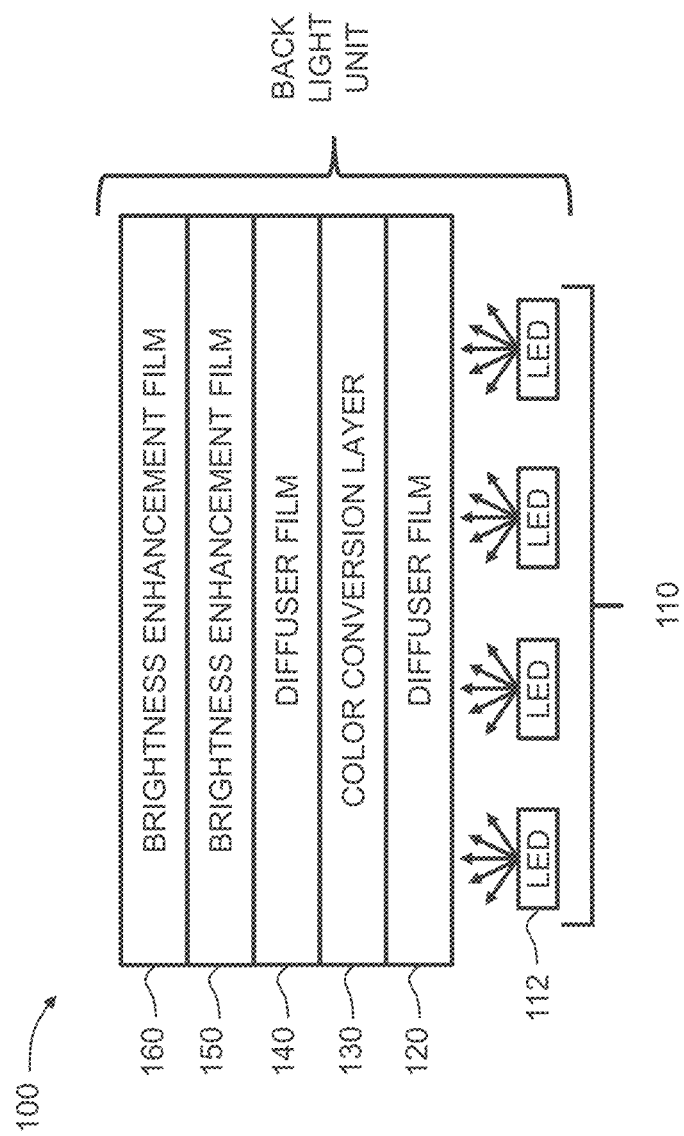

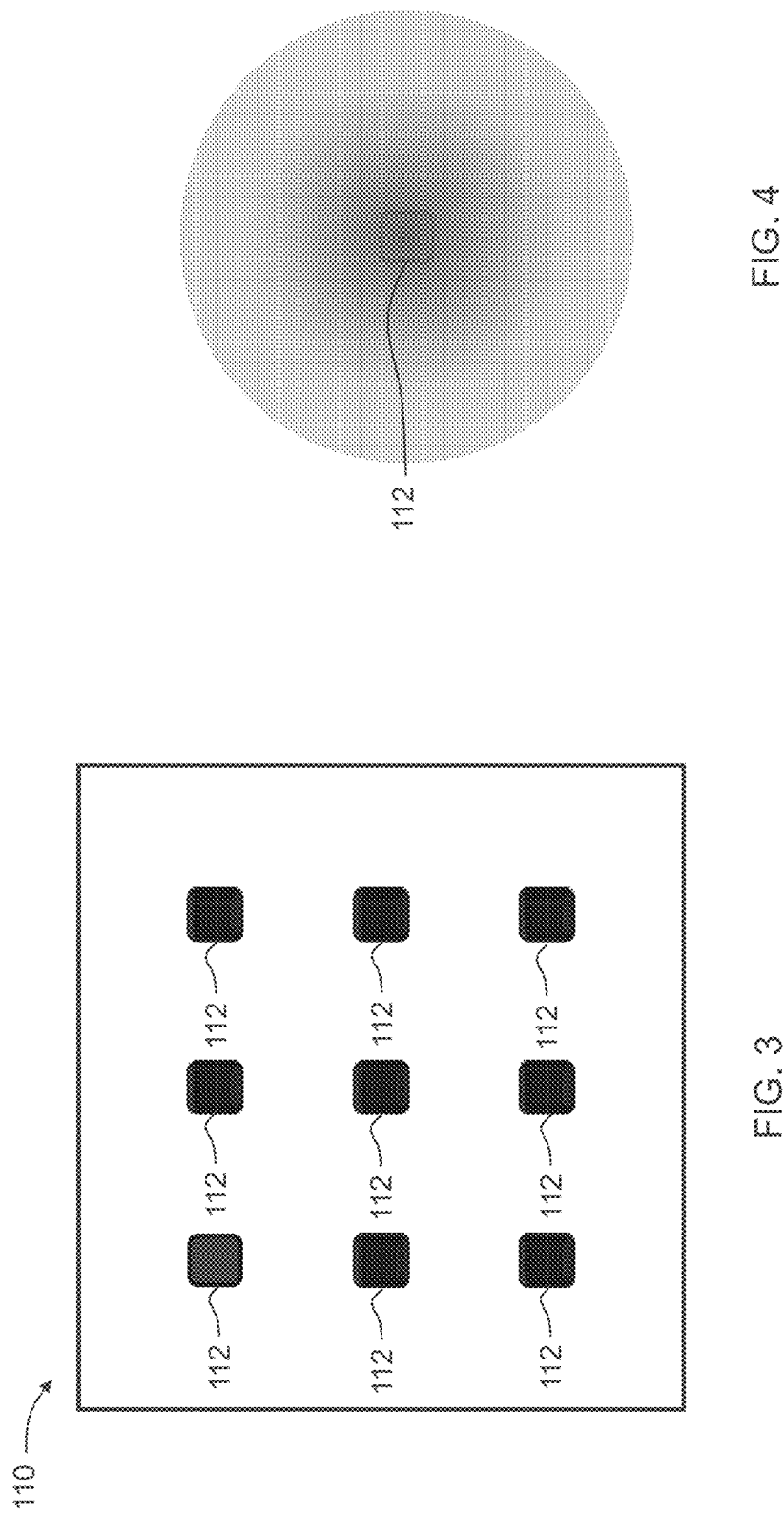

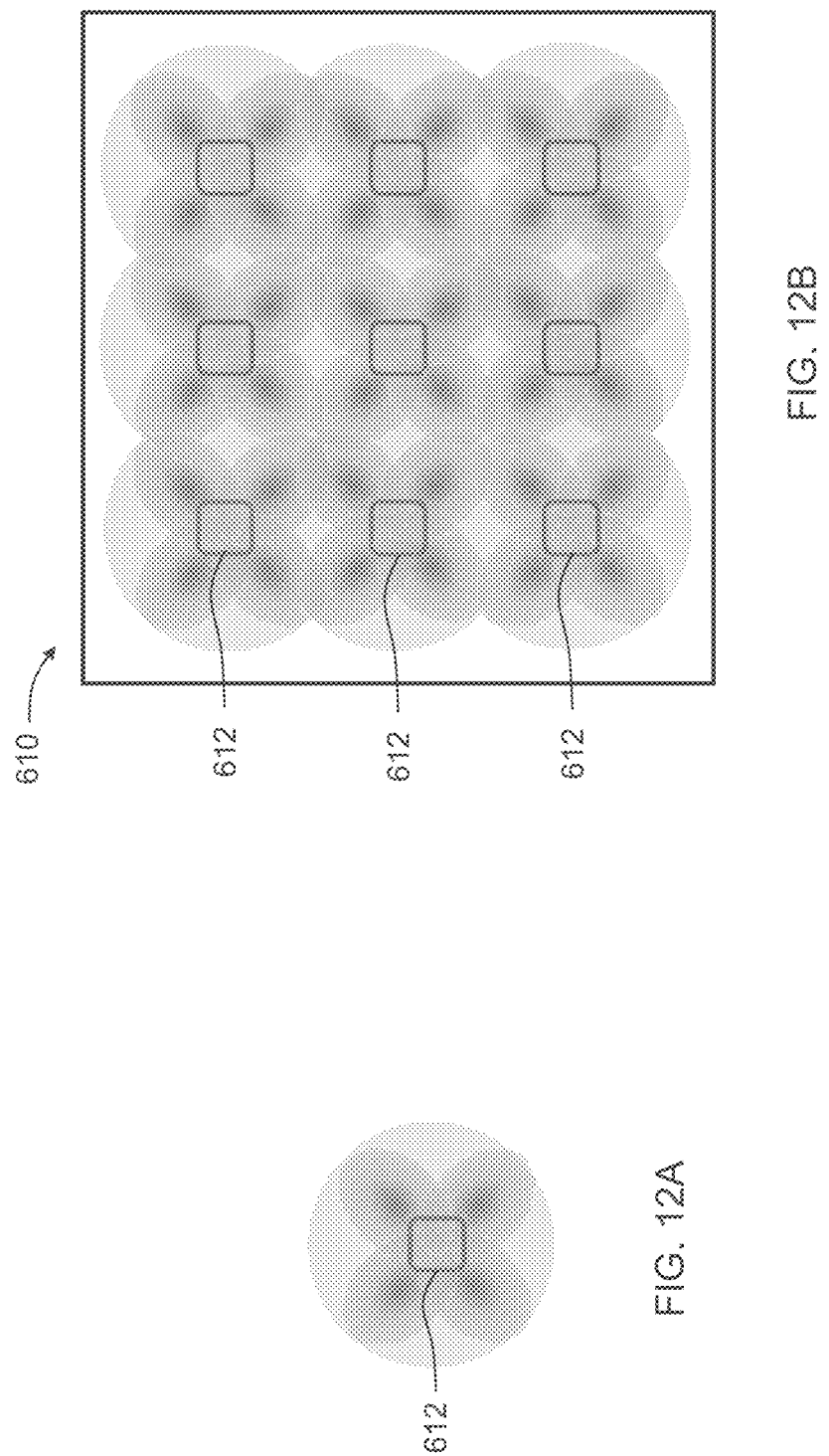

BACK LIGHT UNIT FOR BACKLIT DISPLAYS

CROSS-REFERENCE TO RELATED APPLICATIONS

The present application is a continuation of U.S. patent application Ser. No. 17/015,780, filed on Sep. 9, 2020, entitled "Back Light Unit for Backlit Displays", which claims benefit of priority from U.S. Provisional Patent Application Ser. No. 62/898,693, filed Sep. 11, 2019, U.S. Provisional Patent Application Ser. No. 62/929,309, filed Nov. 1, 2019, and U.S. Provisional Patent Application Ser. No. 63/023,618, filed May 12, 2020, the entire contents of all of which are incorporated herein by reference.

FIELD

The present invention is generally related to a back light unit of a backlit display, particularly for backlit displays with light emitting diode (LED) light sources.

BACKGROUND

In the pursuit of improved image quality, liquid crystal displays (LCDs) are increasingly using a back light unit architecture 100, schematically illustrated in FIG. 1, that includes of an array 110 of individual short wavelength (blue) LEDs 112. FIGS. 2A and 2B illustrate a typical intensity distribution of light emitted from a single LED as a function of angle, as measured by a goniophotometer. As illustrated, the LED source approximates a Lambertian source that emits a substantially symmetrical light distribution relative to the nadir, with the highest intensity of light at the nadir.

Returning to FIG. 1, a series of films may be used to spread or diffuse the light emitted from the blue LEDs 112 so that the back light unit 100 may deliver a more uniform light to the LCD panel (not shown) containing the liquid crystals located above the back light unit 100. As illustrated, the back light unit 100 typically includes a diffuser film 120, which may be a volumetric diffuser or a circular diffuser, a color conversion layer 130 that uses either quantum dots or phosphor material, for example, to convert some of the blue light emitted by the LEDs 110 to green and red light, a diffuser film 140, which may be a volumetric diffuser or a circular diffuser resulting from a random textured surface, configured to spread or diffuse the light exiting the color conversion layer 130, and two brightness enhancing films (BEFs) 150, 160, which are often two prism films rotated approximately 90 degrees relative to each other. There may be additional films in the back light unit 100 that are used to improve the overall uniformity and brightness of the light being delivered to the LCD panel. In some back light units, white LEDs may be used without a color conversion layer.

When LEDs 112 are arranged in an array, such as the array 110 illustrated in FIG. 3, it is desirable to hide the individual LEDs 112 and present a bright and uniform light to the LCD panel. As noted above, one approach to achieving this goal is to include one or more diffusers, such as the diffuser film 120, in the back light unit 100 to diffuse, spread, or blur the beams of light emitted by the LEDs 112. FIG. 4 schematically illustrates such diffusion of the light emitted by a single LED 112, with the darker shades of grey represent a brighter light than the lighter shades of grey. Such diffusion may also reduce the mean energy of the light.

In addition, electronic devices that include LCDs are become thinner and thinner. As a result, the back light units of such displays are also becoming thinner and thinner, which presents another challenge to manage the light being emitted by the LEDs 112 in an effective manner. For example, when the diffuser film 120 is placed over the array 110 of LEDs 112, as schematically illustrated in FIG. 5A, the individual points of light emitted by the LEDs are diffused such that light having less intensity from adjacent LED's 112 start to overlap to create areas of light with higher intensity. If the thickness of the diffuser film 120 is increased, which may be undesirable for thinner back light units 100, the individual points of light may be spread even further and provide better uniformity of the light, but there are still brighter and darker regions, as schematically illustrated in FIG. 5B.

It is desirable to have a back light unit 100 for an LCD display having an array 110 of blue LEDs 112 and a thin profile, yet still deliver bright and uniform light to the LCD panel while effectively hiding the individual LEDs 112.

SUMMARY

According to an embodiment of the invention, there is provided a back light unit that includes an array of light emitting diodes, at least two optical films positioned above the array of light emitting diodes, and a pair of brightness enhancement films positioned above the at least two optical films. A majority of the at least two optical films are light splitting optical films having a plurality of light splitting microstructures on at least one surface thereof.

In an embodiment, all of the at least two optical films have the plurality of light splitting microstructures on at least one surface thereof.

In an embodiment, the back light unit includes a color conversion layer positioned above the array of light emitting diodes and below the pair of brightness enhancement films. In an embodiment, the color conversion layer is positioned above at least one light splitting optical film. In an embodiment, the color conversion layer has at least one surface comprising a plurality of light splitting microstructures.

In an embodiment, the back light unit includes at least one additional light splitting optical film positioned above the color conversion layer and below the pair of brightness enhancement films.

In an embodiment, the at least two optical films includes a first light splitting optical film comprising a plurality of first parallel linear prisms extending in a first direction on a first side thereof and a plurality of first elliptical lenticular structures extending in a second direction on a second side thereof. The second direction is substantially orthogonal to the first direction. The first side faces the array of light emitting diodes. In an embodiment, the at least two optical films include a second light splitting optical film positioned above the first light splitting optical film. The second light splitting optical film includes a plurality of second parallel linear prisms extending substantially in the first direction on a first side thereof and a plurality of second elliptical lenticular structures extending in the second direction on a second side thereof. The first side of the second light splitting optical film faces the second side of the first light splitting optical film.

In an embodiment, the at least two optical films include a third light splitting optical film positioned above the second light splitting optical film. The third light splitting optical film includes a plurality of third parallel linear prisms extending substantially in the second direction on a first side thereof. In an embodiment, the third light splitting further includes a plurality of microstructures on a second side thereof. In an embodiment, the second side of the third light splitting optical film faces the second side of the second light splitting optical film.

In an embodiment, at least one of the optical films is a first light splitting optical film that includes a plurality of first parallel linear prisms extending in a first direction on a first side thereof and a plurality of second parallel linear prisms extending in the first direction on a second side thereof. In an embodiment, at least one of the optical films is a second light splitting optical film that includes a plurality of first parallel linear prisms extending in the first direction on a first side thereof and a plurality of second parallel linear prisms extending in the first direction on a second side thereof. In an embodiment, at least one of the optical films is a second light splitting optical film includes a plurality of first parallel linear prisms extending in a second direction, substantially orthogonal to the first direction, on a first side thereof and a plurality of second parallel linear prisms extending in the second direction on a second side thereof.

In an embodiment, at least one of the optical films is a first light splitting optical film that includes a plurality of first parallel linear prisms extending in a first direction on a first side thereof and a plurality of second parallel linear prisms extending in a second direction, substantially orthogonal to the first direction, on a second side thereof.

In an embodiment, two of the optical films are light splitting optical films. Each light splitting optical film includes a plurality of microstructures on a first side thereof and a plurality of parallel linear prisms extending in a first direction on a second side thereof. Each microstructure has a shape of a quad pyramid.

In an embodiment, three of the optical films are light splitting optical films. Each light splitting optical film includes a plurality of microstructures on a first side thereof and a plurality of parallel linear prisms extending in a first direction on a second side thereof. Each microstructure has a shape of a quad pyramid.

According to an aspect of the invention, there is provided a back light unit that includes an array of light emitting diodes, and a lower stack of optical films positioned above the array of light emitting diodes and configured to receive light emitted by the array of light emitting diodes. The lower stack of optical films includes a first light splitting optical film that includes a plurality of first light splitting microstructures on a first side thereof facing the array of light emitting diodes, the plurality of first light splitting microstructures constructed and arranged to split light received from the array of light emitting diodes. The lower stack of optical films includes a second light splitting optical film positioned above the first light splitting optical film. The second light splitting optical film includes a plurality of second light splitting microstructures on a first side thereof facing the first light splitting optical film, the plurality of second light splitting microstructures constructed and arranged to split light received from the first light splitting optical film. The back light unit includes a color conversion layer positioned above the lower stack of optical films and configured to receive light from the lower stack of optical films, an upper stack of optical films positioned above the color conversion layer and configured to receive light from the color conversion layer, and a pair of brightness enhancement films positioned above the upper stack of optical films and configured to receive light from the upper stack of optical films.

In an embodiment, the plurality of first light splitting microstructures includes a plurality of first parallel linear prisms, and the plurality of second light splitting microstructures includes a plurality of second parallel linear prisms oriented orthogonal to the plurality of first parallel linear prisms.

In an embodiment, the first light splitting optical film also includes a plurality of first random rough microstructures on a second side thereof, and the second light splitting optical film also includes a plurality of second random rough microstructures on a second side thereof.

In an embodiment, the lower stack of optical films also includes a third optical film positioned above the second light splitting optical film. In an embodiment, the third optical film includes a plurality of microstructures facing the second light splitting optical film. In an embodiment, each of the plurality of microstructures of the third optical film generally has the shape of a four-sided pyramid.

In an embodiment, the upper stack of optical films includes a third light splitting optical film positioned above the color conversion layer. In an embodiment, the upper stack of optical films also includes a fourth light splitting optical film positioned above the third light splitting optical film.

In an embodiment, the color conversion layer has at least one surface that includes a plurality of light splitting microstructures.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following figures are illustrated to emphasize the general principles of the present disclosure and are not necessarily drawn to scale, although at least one of the figures may be drawn to scale. Reference characters designating corresponding components are repeated as necessary throughout the figures for the sake of consistency and clarity.

FIG. 1 is a schematic illustration of a typical back light unit that includes an array of LEDs for an LCD display;

FIG. 3 is a schematic illustration of a top view of a portion of the array of LEDs of the back light unit of FIG. 1;

FIG. 4 is a schematic illustration of a top view of a distribution of light output from a single LED after the light has passed through a diffuser film;

FIG. 12A is a schematic illustration of a top view of a distribution of light output from a single LED after the light has passed through the two light splitting optical films of FIG. 8;

FIG. 12B is a schematic illustration of a top view of a portion of the array of LEDs of FIG. 6 after the light emitted by the LEDs has passed through the light splitting optical films of FIG. 8;

DETAILED DESCRIPTION

Figure 6:
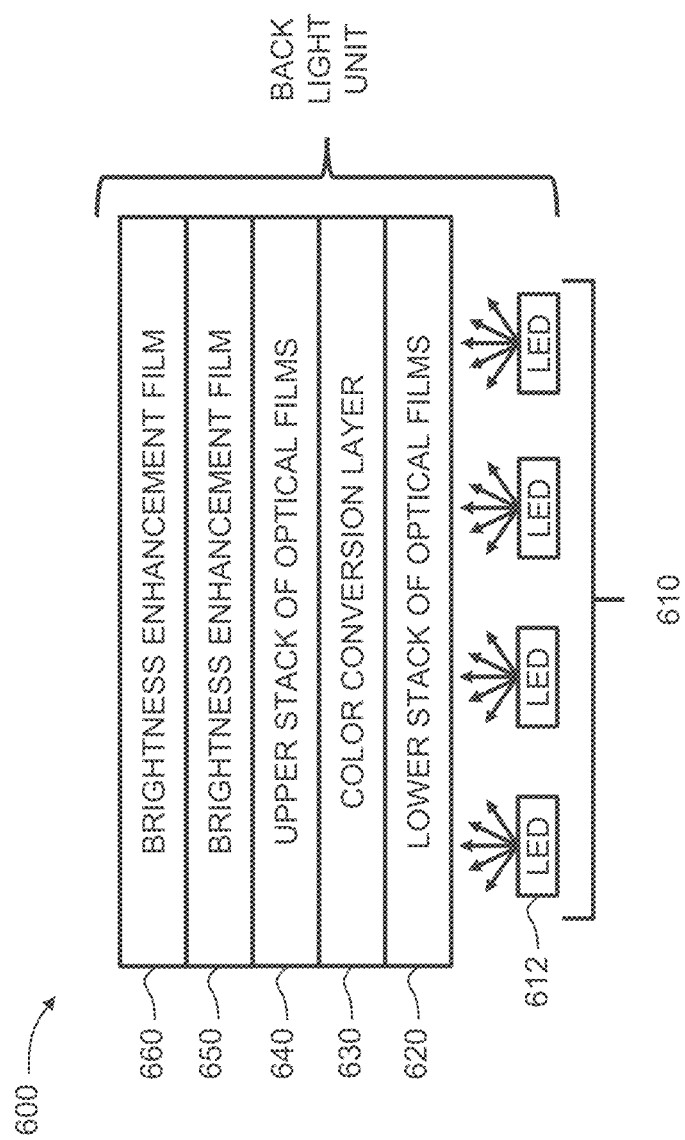
FIG. 6 is a schematic illustration of a back light unit for an LCD display in accordance with embodiments of the invention.

FIG. 6 schematically illustrates a portion of a back light unit 600 according to embodiments of the present invention. As illustrated, the back light unit 600 includes an array 610 of LEDs 612, which may be the same blue light emitting LEDs 112 described above, a lower stack of optical films 620, a color conversion layer 630 above the lower stack of optical films 620, an upper stack of optical films 640, which may include one or more diffuser films, above the color conversion layer 630, a first brightness enhancement film ("BEF") 650 above the upper stack of optical films 640, and a second brightness enhancement film ("BEF") 660 above the first BEF 650. The first BEF 650 and the second BEF 660 may have substantially the same structure, but turned 90° relative to each other, as is known in the art. The color conversion layer 630 may include, for example, phosphor or quantum dots and be configured to change the wavelength of a portion of the light being emitted from the LEDs 612, such as from a blue wavelength to red and green wavelengths, as is known in the art.

Figure 7:
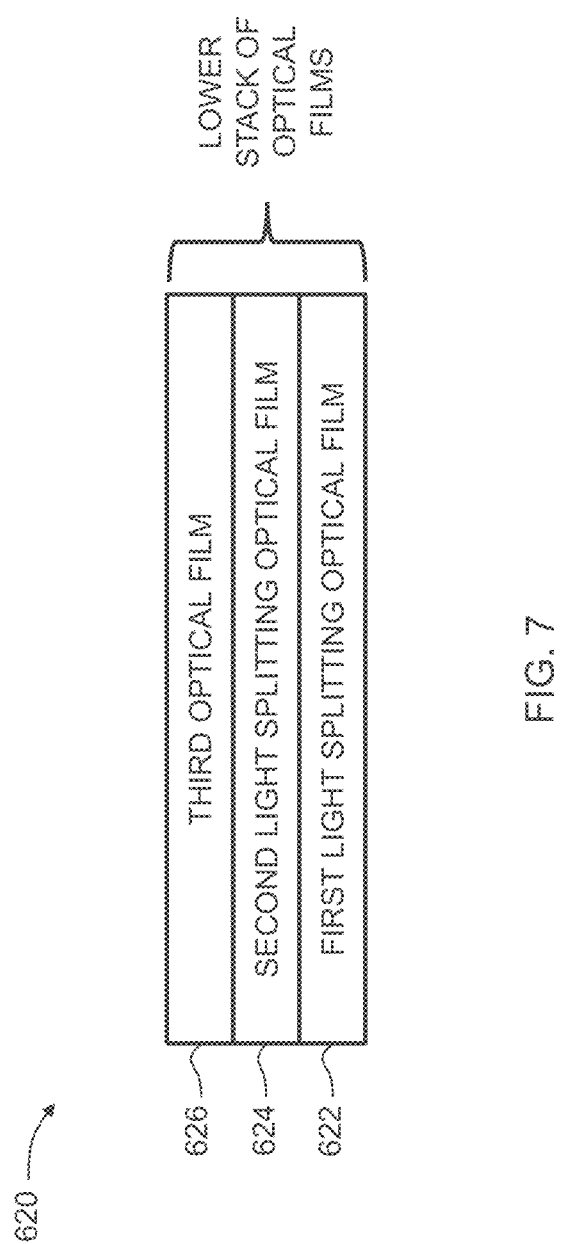
FIG. 7 is a schematic illustration of a lower stack of optical films of the back light unit of FIG. 6 in accordance with embodiments of the invention.

FIG. 7 is a more detailed schematic view of the lower stack of optical films 620 of FIG. 6. As illustrated, the lower stack of optical films 620, which are the optical films that are positioned between the LEDs 612 and the color conversion layer 630, includes a first light splitting optical film 622, a second light splitting optical film 624, and an optional third optical film 626. The third optical film 626 may be, for example, a volumetric diffuser film or another light splitting optical film, as described in further detail below. Additional optical films may be used in the lower stack of optical films 620. The illustrated embodiment is not intended to be limiting in any way.

As defined herein, an "optical film" is a polymeric film. As defined herein, a "light splitting optical film" is a polymeric film that includes a plurality of light splitting micro lenses or microstructures on at least one surface. As defined herein, a "light splitting microstructure" is a microstructure which when a collimated beam is directed on axis to the microstructure, the collimated beam is split into two or more beams with a region of lower relative intensity on axis.

For example, a light splitting microstructure may be in the form of a prism and split an incoming beam into two beams with the angle between the two beams being dependent on the prism angle and refractive index of the prism material. In an embodiment, a prism with a 90-degree angle and refractive index of 1.5 may split the incoming on-axis beam into two beams at approximately ±25 degrees. In an embodiment, a light splitting microstructure may be in the form of a three-sided pyramid and split the incoming on-axis beam into three beams. In an embodiment, a light splitting microstructure may be in the form of a four-sided pyramid and split the incoming on-axis beam into four beams. In an embodiment, a light splitting microstructure may be in the form of a cone and split the incoming on-axis beam into a conical ring.

Such light splitting microstructures may be created using many techniques known in the art. For example, in an embodiment, the shape of the light splitting microstructure may be cast onto a substrate using a suitable master mold, and thermally-curing polymer or ultraviolet (UV) light curing polymer, or the shape may be impressed into a thermoplastic substrate through compression molding or other molding, or may be created at the same time as the substrate using extrusion-embossing or injection molding. The microstructures may be produced by replicating a master. For example, an optical film may be made by replication of a master containing the desired shapes as described in U.S. Pat. No. 7,190,387 B2 to Rinehart et al., entitled "Systems And Methods for Fabricating Optical Microstructures Using a Cylindrical Platform and a Rastered Radiation Beam"; U.S. Pat. No. 7,867,695 B2 to Freese et al., entitled "Methods for Mastering Microstructures Through a Substrate Using Negative Photoresist"; and/or U.S. Pat. No. 7,192,692 B2 to Wood et al., entitled "Methods for Fabricating Microstructures by Imaging a Radiation Sensitive Layer Sandwiched Between Outer Layers", assigned to the assignee of the present invention, the disclosures of all of which are incorporated herein by reference in their entirety as if set forth fully herein. The masters themselves may be fabricated using laser scanning techniques described in these patents and may also be replicated to provide microstructures using replicating techniques described in these patents.

In an embodiment, laser holography, known in the art, may be used to create a holographic pattern that creates the desired microstructures in a photosensitive material. In an embodiment, projection or contact photolithography, such as used in semiconductor, display, circuit board, and other common technologies known in the art, may be used to expose the microstructures into a photosensitive material. In an embodiment, laser ablation, either using a mask or using a focused and modulated laser beam, may be used to create the microstructures including the indicia in a material. In an embodiment, micromachining (also known as diamond machining), known in the art, may be used to create the desired microstructures from a solid material. In an embodiment, additive manufacturing (also known as 3D printing), known in the art, may be used to create the desired microstructure in a solid material.

Figure 8:
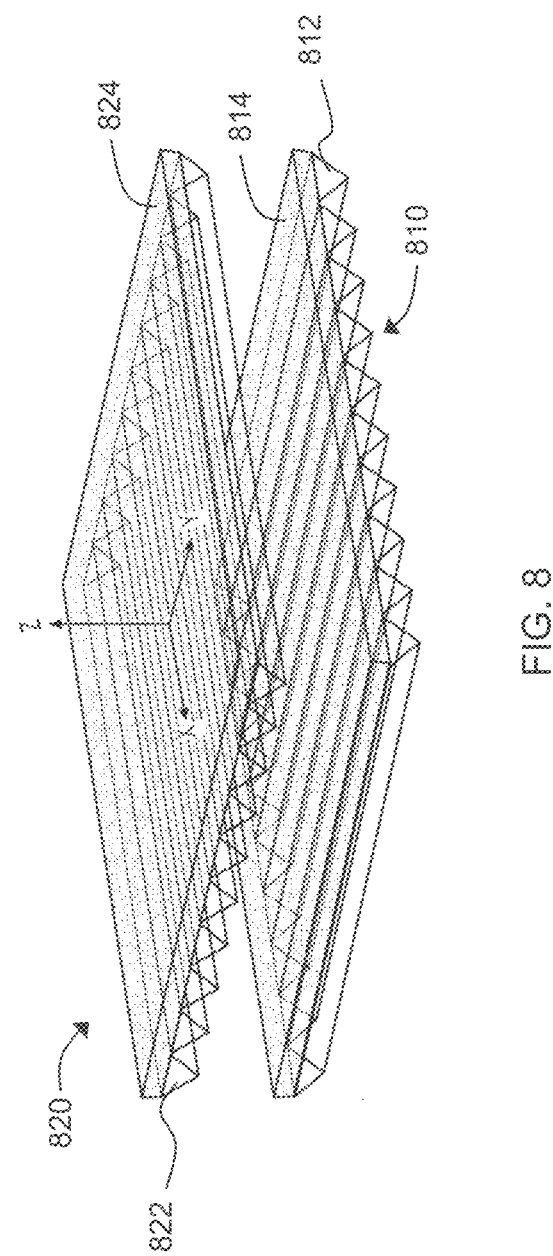
FIG. 8 is a schematic illustration of two light splitting optical films of the lower stack of optical films of FIG. 7 in accordance with embodiments of the invention.

FIG. 8 schematically illustrates an embodiment of a first light splitting optical film 810 and a second light splitting optical film 820, which may be used as the first light splitting optical film 622 and the second light splitting optical film 624 of FIG. 7. The first light splitting optical film 810 is configured to receive individual beams of light emitted by the array of LEDs 610 and split each beam of light into two beams of light. The second light splitting optical film 820 is configured to receive the beams of light from the first light splitting optical film 810 and split each beam of light into two beams of light, thereby resulting in an individual beam of light received by the first light splitting optical film 810 being split into four beams of light upon exiting the second light splitting optical film 820. As illustrated in FIG. 8, the first light splitting optical film 810 includes a plurality of light splitting microstructures 812 in the form of parallel linear prisms that extend across one side of the first light splitting optical film 810 that faces downward (and toward the array of LEDs, not shown). The first light splitting optical film 810 also includes a plurality of random rough microstructures 814 on a side opposite the parallel linear prisms 812. Similarly, the second light splitting optical film 820 includes a plurality of light splitting microstructures 822 in the form of parallel linear prisms that extend across one side of the second light splitting optical film 820 that faces downward and toward the first light splitting optical film 810, and a plurality of random rough microstructures 824 on a side opposite the parallel linear prisms 822.

Figure 9:
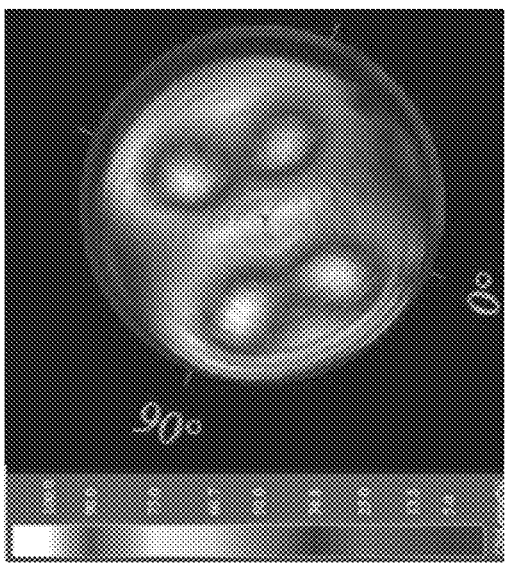
FIG. 9 is a three-dimensional plot of a distribution of the light output from the LED source having the light distribution of FIG. 2A after the light has passed through the two light splitting optical films of FIG. 8, as measured by the goniophotometer.

The first light splitting optical film 810 and the second light splitting optical film 820 are oriented relative to each other so that the plurality of light splitting microstructures 812 of the first light splitting optical film 810 is oriented 90° relative to the plurality of light splitting microstructures 822 of the second light splitting optical film 820, which allows the original beam of light from an individual LED (see FIG. 2A) to be split into four beams of light, as measured by a goniophotometer and illustrated in FIG. 9. By increasing the refractive index of the plurality of light splitting microstructures 812, 822, the original beam of light from an individual LED may be split into four beams of light and spread even further, as measured by a goniophotometer and illustrated in FIG. 10.

Figure 2B:
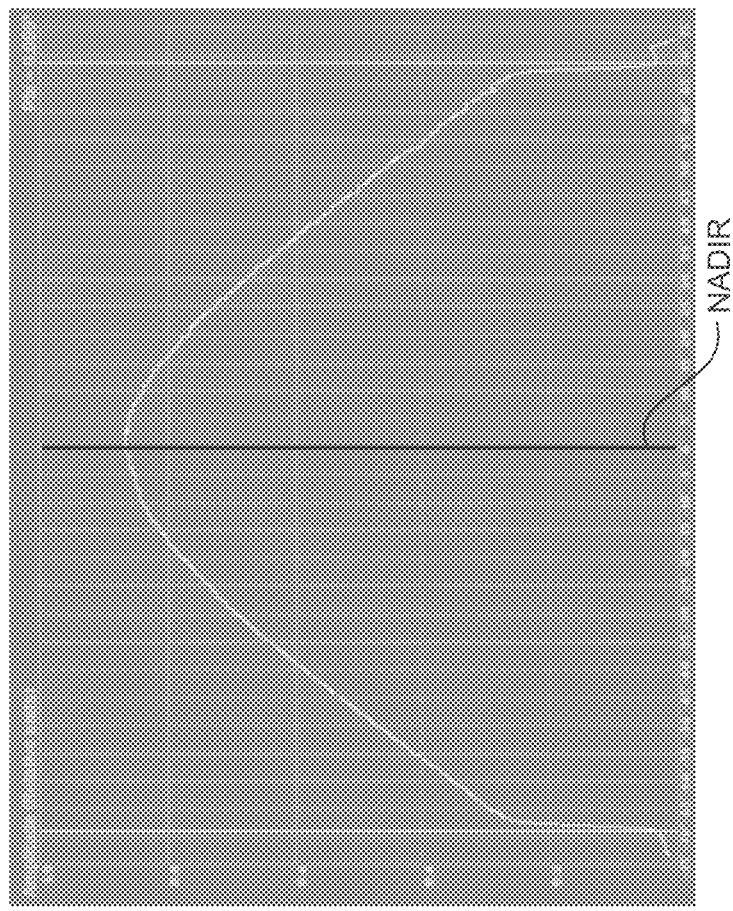
FIG. 2B is the measured light distribution of FIG. 2A represented in two dimensions.
Figure 2A:
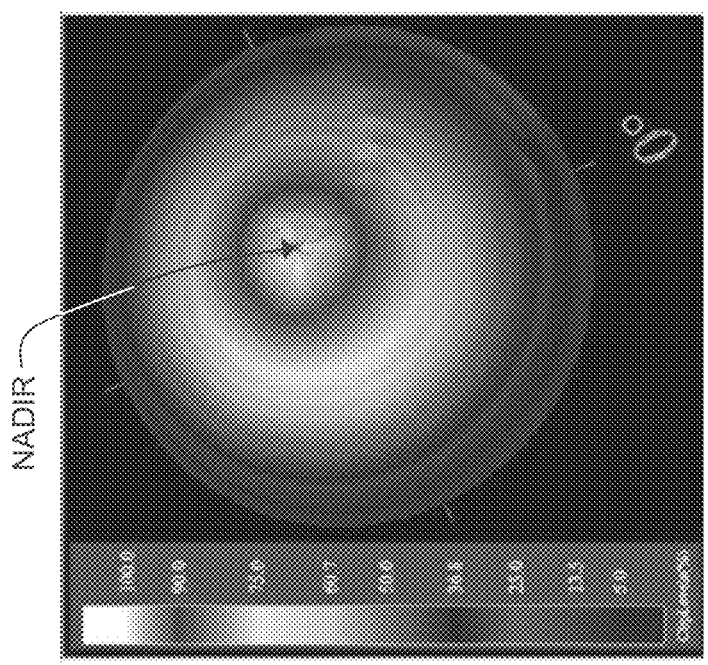
FIG. 2A is a three-dimensional plot of a distribution of light output from an LED as a function of angle, as measured by a goniophotometer.
Figure 10:
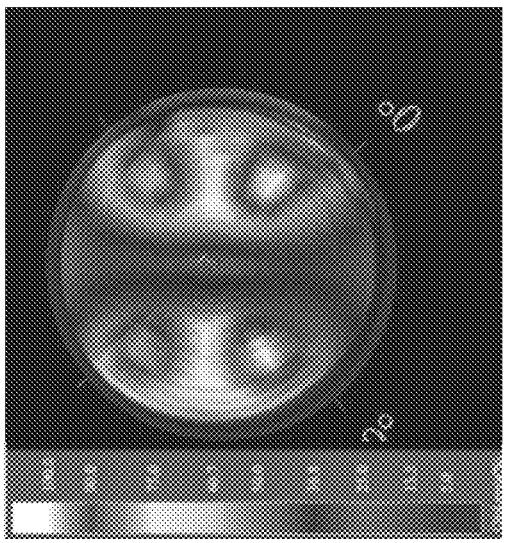
FIG. 10 is a three-dimensional plot of a distribution of the light output from the LED source having the light distribution of FIG. 2A after the light has passed through the two light splitting optical films of FIG. 8 having a higher refractive index than the two light splitting optical films having the light distribution of FIG. 9, as measured by the goniophotometer.
Figure 11:
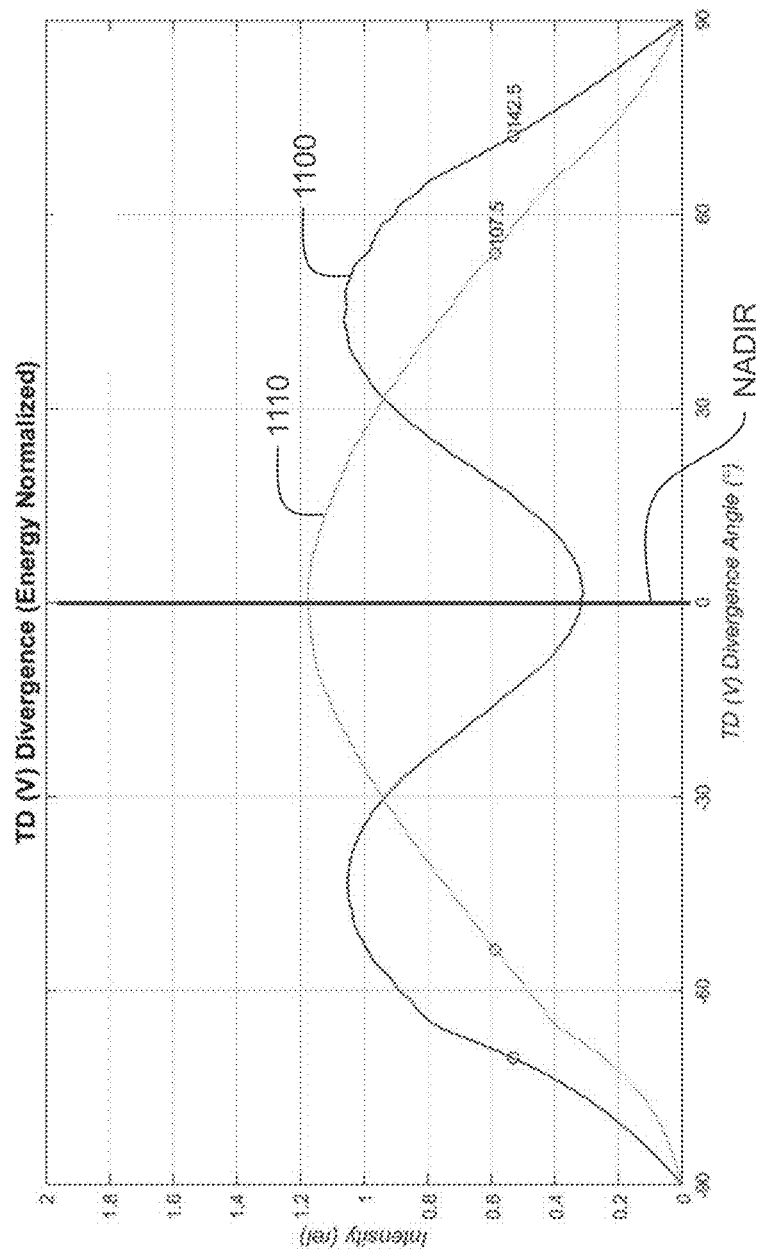
FIG. 11 is a two-dimensional plot of the measured light distribution of FIG. 10 and the measured distribution of light output from the LED source having the light distribution of FIG. 2A after the light has passed through a circular diffuser.

FIG. 11 is a two-dimensional plot of the measured light distribution of FIG. 10 (represented by 1100) and the measured distribution of light output from the LED source having the light distribution of FIG. 2A after the light has passed through a circular diffuser (represented by 1110). As illustrated, the pair of light splitting optical films 810, 820 splits the light received from the LED and spreads the light wider (i.e., away from the nadir that is at 0°) than a circular diffuser, and also suppresses the on-axis (i.e., nadir) light as compared to the circular diffuser. The on-axis light is suppressed by reflecting the on-axis light back towards the LED, which helps hide the LED from being seen above the pair of light splitting optical films 810, 820.

Figure 5B:
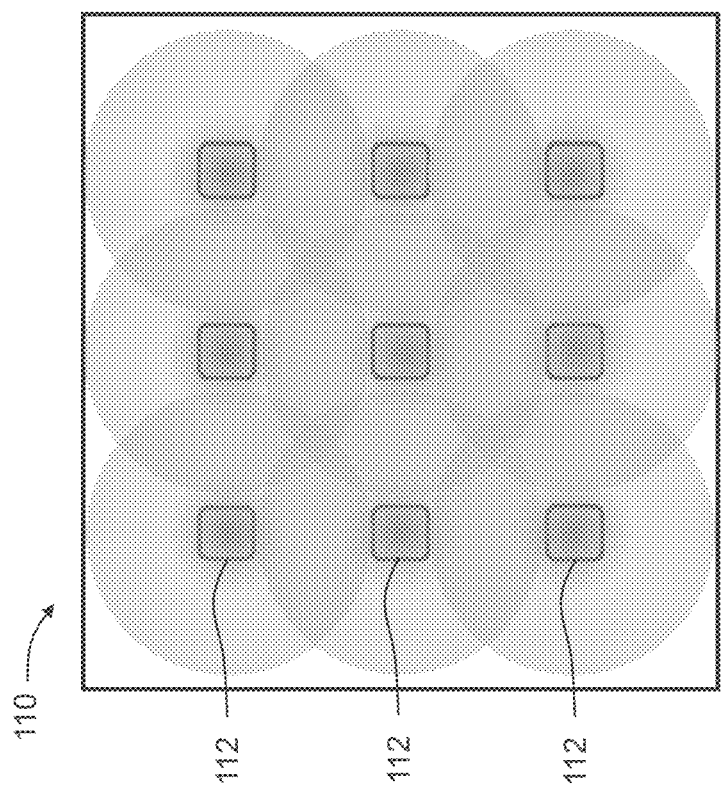
FIG. 5B is a schematic illustration of the array of LEDs of FIG. 3 after the light emitted by the LEDs has passed through a diffuser film having a thickness greater than the diffuser film used for FIG. 5A.
Figure 5A:
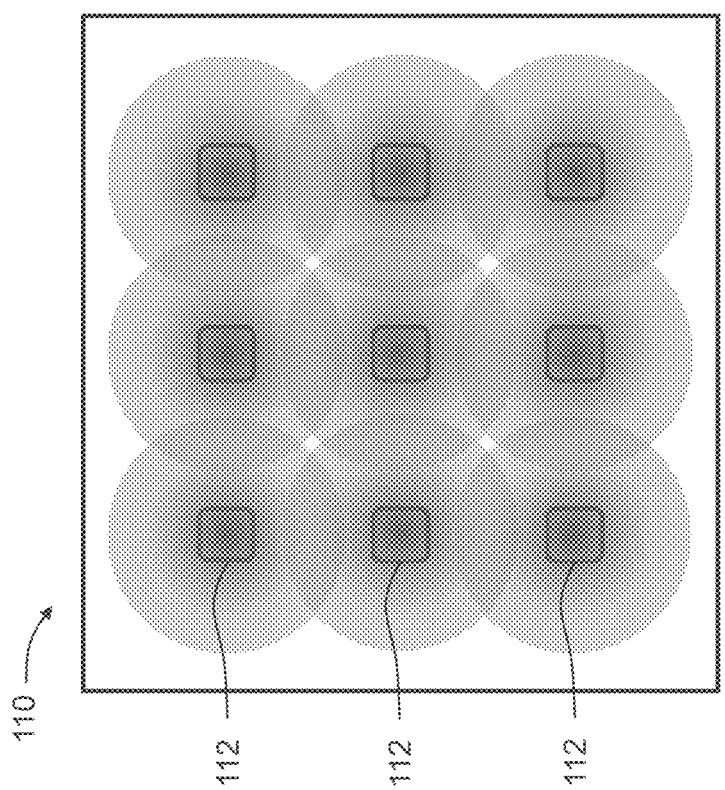
FIG. 5A is a schematic illustration of a top view of the array of LEDs of FIG. 3 after the light emitted by the LEDs has passed through the diffuser film.

FIG. 12A schematically illustrates the effect of the two light splitting optical films 810, 820 on the light emitted by a single LED 612, in contrast to the effect of a circular diffuser on the light emitted by a single LED 112 schematically illustrated in FIG. 4. FIG. 12B schematically illustrates the effect of the two light splitting optical films 810, 820 on the light emitted by the array 610 of LEDs 612, in contrast to the effect of the circular diffuser on the array 110 of LEDs 112 schematically illustrated in FIGS. 5A and 5B. As depicted, the light output by the two light splitting optical films 810, 820 is generally brighter and more uniform than the light output by the circular diffusers.

To investigate a further enhancement of the uniformity of the light output by the pair of light splitting optical films 810, 820, a circular diffuser providing moderate diffusion was placed over the pair of light splitting optical films 810, 820 having the higher refractive index (output illustrated in FIG. 10), and the light passing through the stack of three films was measured with the goniophotometer. The result is illustrated in FIG. 13, and indicates that the Gaussian diffusion after the light was split in four by the pair of light splitting optical films 810, 820 appears to suppress much of the desirable spreading of light created by the pair of light splitting optical films 810, 820.

A volumetric diffuser providing very high diffusion was placed over the pair of light splitting optical films 810, 820 having the higher refractive index, and the light passing through the stack of three films was measured with the goniophotometer. The result is illustrated in FIG. 14, and indicates that the increased diffusion after the light was split in four by the pair of light splitting optical films 810, 820 appears to further inhibit the desirable spreading of light created by the pair of light splitting optical films 810, 820.

Figure 14:
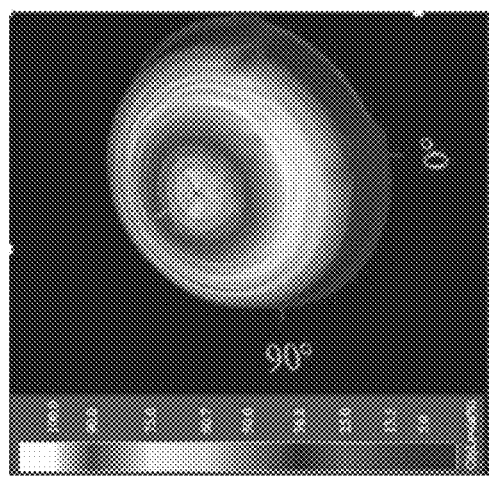
FIG. 14 is a three-dimensional plot of a distribution of the light output from the LED source having the light distribution of FIG. 2A after the light has passed through the two light splitting optical films having the light distribution of FIG. 10 and a volumetric diffuser providing very high diffusion, as measured by the goniophotometer.
Figure 13:
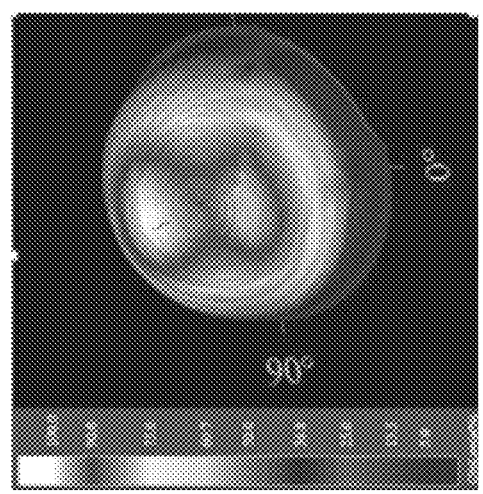
FIG. 13 is a three-dimensional plot of a distribution of the light output from the LED source having the light distribution of FIG. 2A after the light has passed through the two light splitting optical films having the light distribution of FIG. 10 and a circular diffuser providing moderate diffusion, as measured by the goniophotometer.
Figure 15:
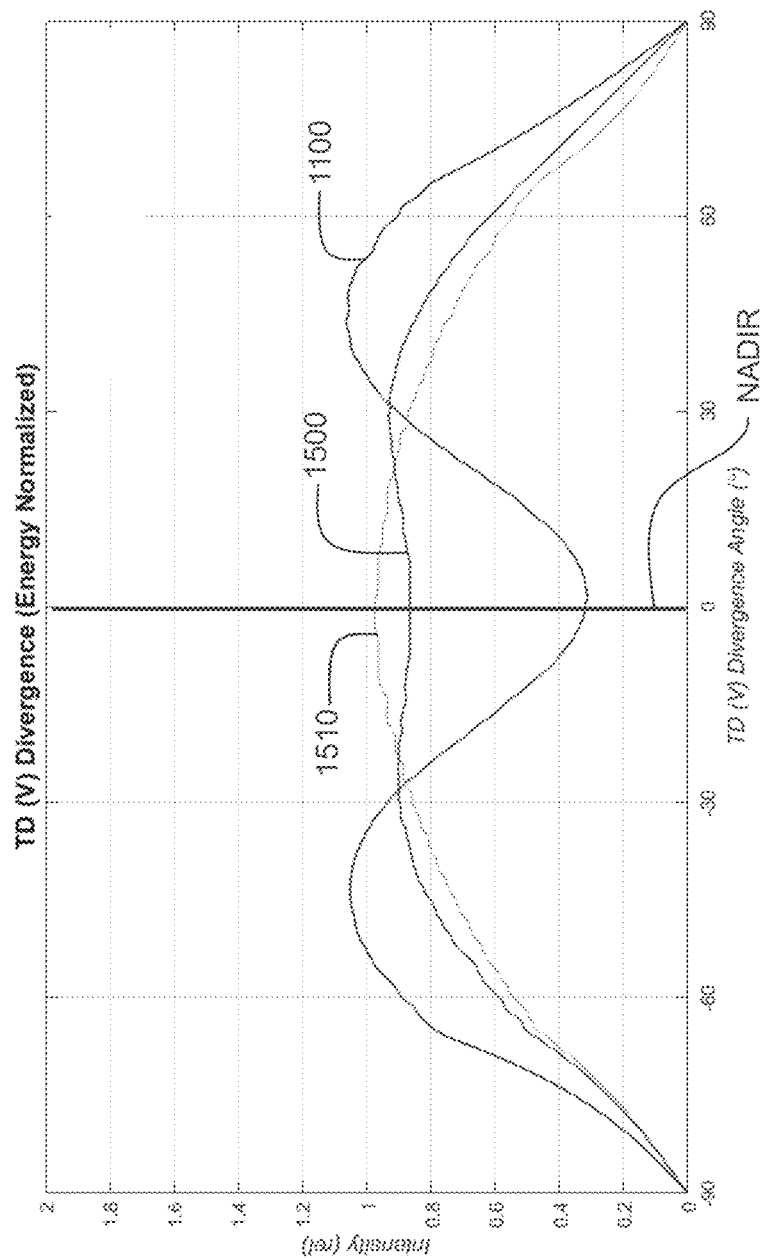
FIG. 15 is a two-dimensional plot of the measured light distributions of FIGS. 10, 13 and 14.

FIG. 15 is a two-dimensional plot of the measured light distributions of FIGS. 10, 13 and 14. More specifically, FIG. 15 illustrates a comparison of the two-dimensional light intensity distributions for light upon exiting the pair of light splitting optical films 810, 820 having the higher refractive index (represented by 1100), upon exiting the circular diffuser film providing moderate diffusion (represented by 1500) and upon exiting the volumetric diffuser providing very high diffusion (represented by 1510), and indicates that increasing diffusion decreases the desirable spreading provided by the pair of light splitting optical films 810, 820.

Similar effects that were seen with the circular diffuser and volumetric diffuser have been found with the color conversion layer 630 as well. Specifically, it has been found that phosphor films may also suppress some of the desirable spreading of light created by two or more light splitting optical films 810, 820. Therefore, it may also be desirable to use the pair of light splitting optical films 810, 820 (and in some embodiments, a single light splitting optical film) above the color conversion layer 630 in the upper stack of optical films 640 in addition to the lower stack of films 620 and/or to add light splitting microstructures to one or both surfaces of the color conversion layer 630.

Figure 16:
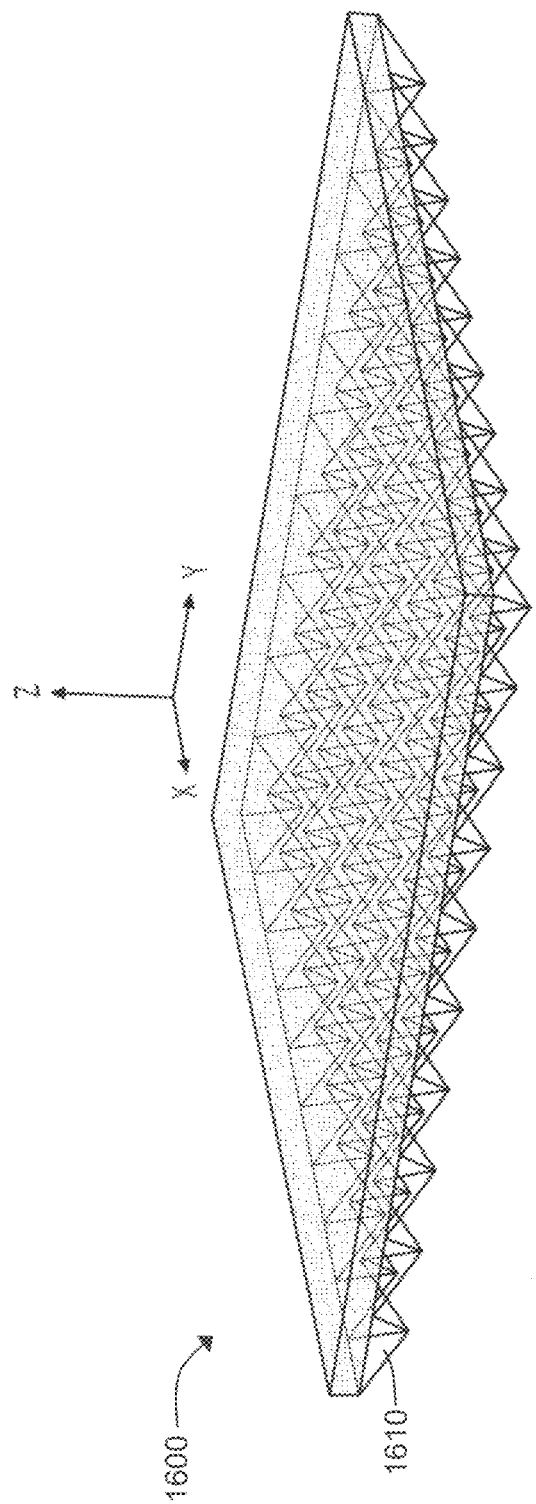
FIG. 16 is a schematic illustration of a third optical film of the lower stack of optical films of FIG. 7 in accordance with embodiments of the invention.
Figure 17:
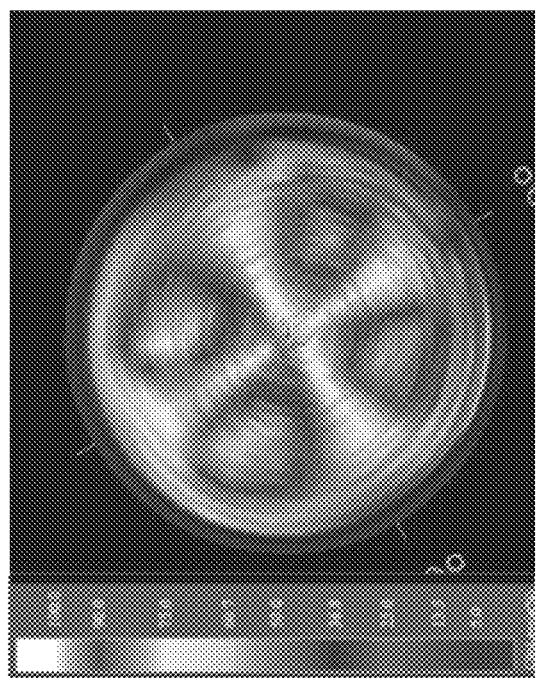
FIG. 17 is a three-dimensional plot of a distribution of the light output from the LED source having the light distribution of FIG. 2A after the light has passed through the two light splitting optical films having the light distribution of FIG. 10 and the third optical film of FIG. 16, as measured by the goniophotometer.

FIG. 16 schematically illustrates an optical film 1600, which may be used as the third optical film 626 in the lower stack of optical films 620 in accordance with an embodiment of the invention. As illustrated, the optical film 1600 includes a plurality of microstructures 1610 in the form of quad (four-sided) pyramids on one side thereof. The optical film 1600 was placed on top of the pair of light splitting optical films 810, 820 having the higher refractive index, with the plurality of microstructures 1610 facing the pair of light splitting optical films 810, 820, and the light passing through the stack of three films 810, 820, 1600 was measured with the goniophotometer. The result is illustrated in FIG. 17 and indicates that after the light was split in four by the pair of light splitting optical films 810, 820, the optical film 1600 having the plurality of microstructures 1610 in the form of quad pyramids increases the uniformity of the light spreading provided by the light splitting optical films 810, 820 in both directions, which is desirable. In an embodiment, the optical film 1600 having the plurality of microstructures 1610 in the form of quad pyramids may be used in place of the pair of light splitting optical films 810, 820.

Figure 18:
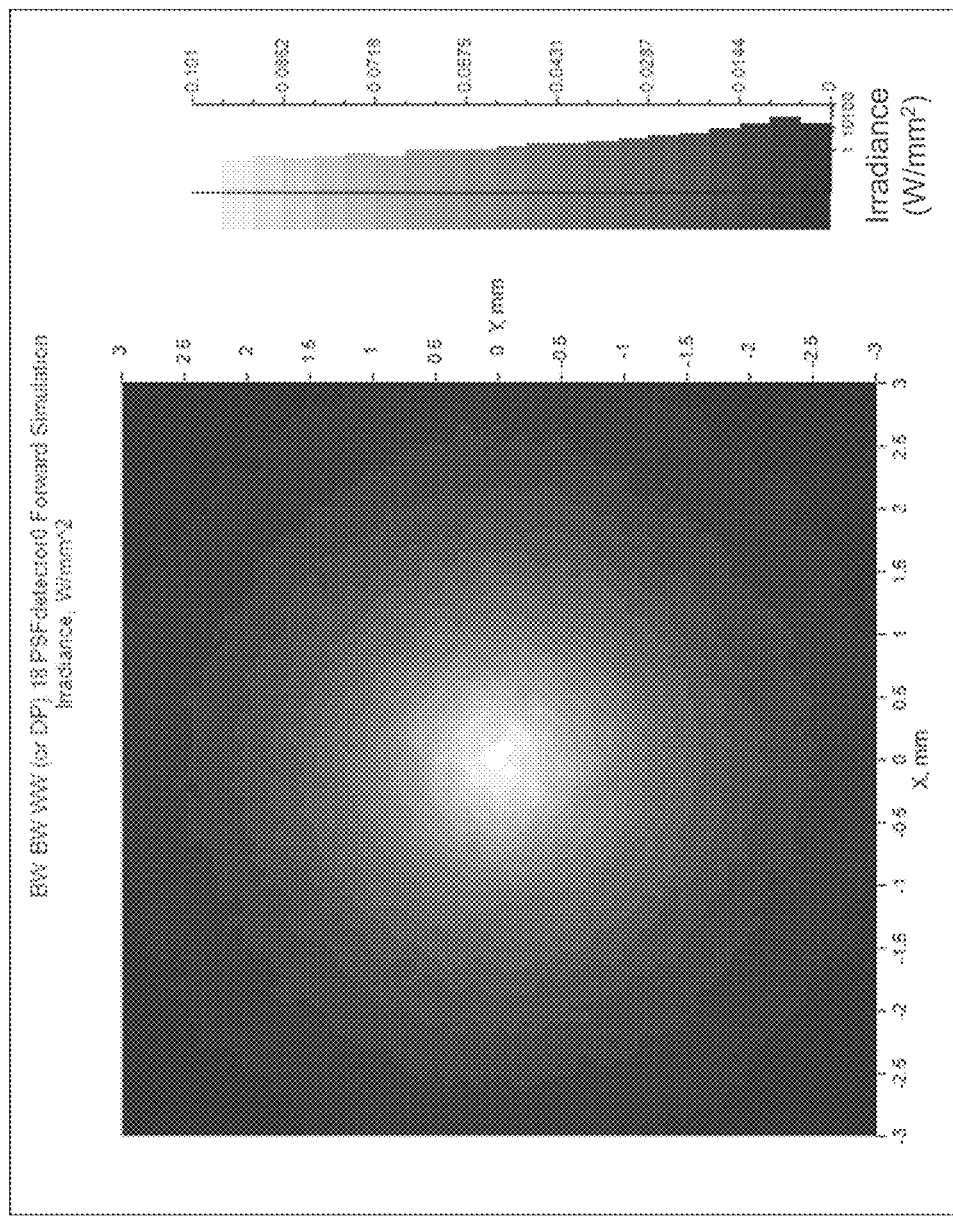
FIG. 18 is an output plot from a modelling program that shows an intensity of light from an LED light source as a function of position in two dimensions after the light has passed through two light splitting optical films having a high refractive index and a volumetric diffuser.

In order to further investigate the effects of the stacks of optical films in accordance with embodiments of the invention, LightTools illumination design software by Synopsis, Inc. was used to model the effects of various stacks of three optical films 622, 624, 626 in the lower stack of optical films 620 on the point spread function ("PSF"), which is the intensity of the light as a function of position (in x-y coordinates) on top of the third optical film 626. FIG. 18 illustrates the modeling result of using the pair of light splitting optical films 810, 820 and a third film in the form of a volumetric diffuser providing very high diffusion. Similar to what was measured with the goniophotometer in FIG. 14, FIG. 18 illustrates a relatively narrow point spreading function (PSF).

Figure 19:
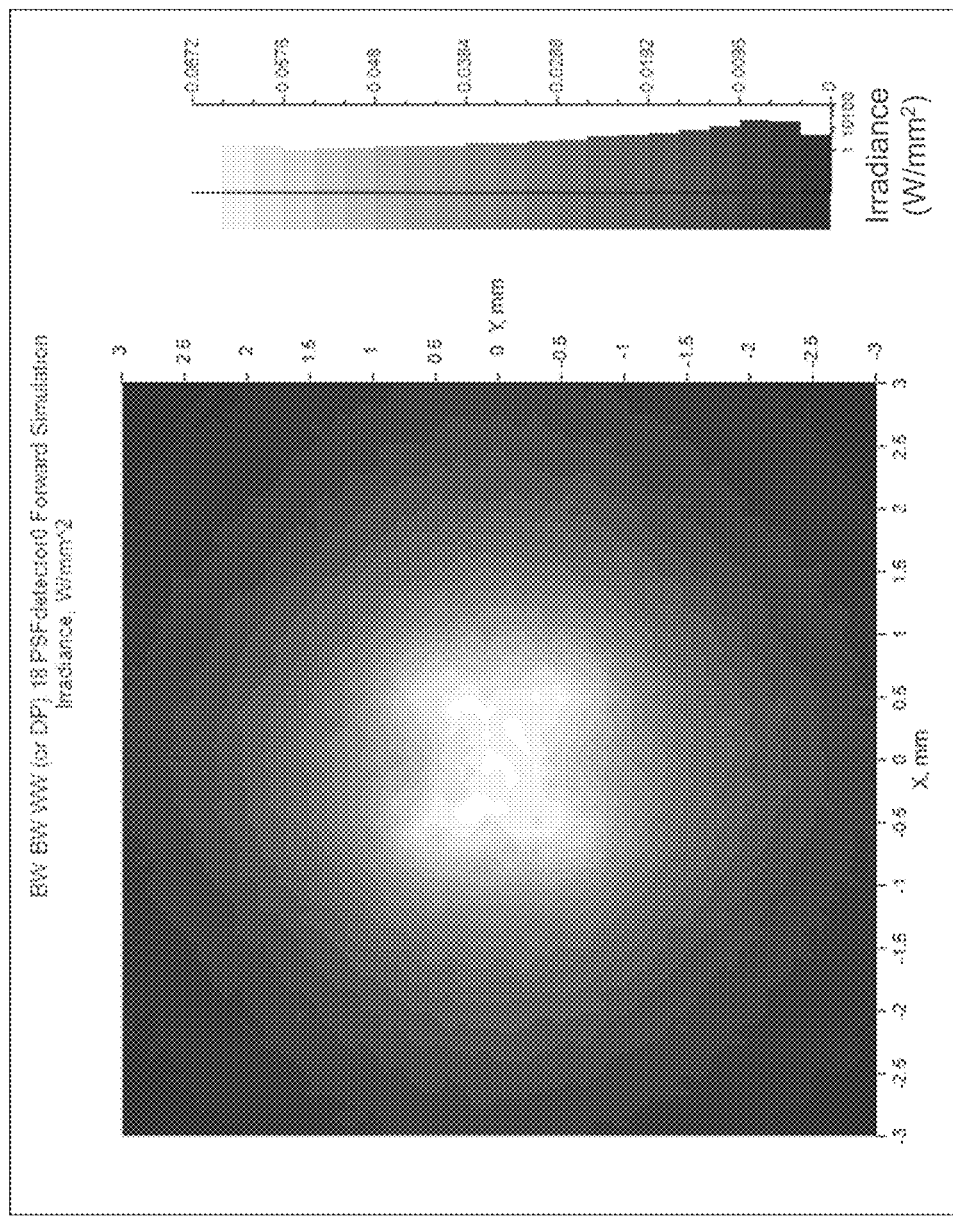
FIG. 19 is an output plot from the modelling program that shows an intensity of light from an LED light source as a function of position in two dimensions after the light has passed through two light splitting optical films having a high refractive index and the third optical film of FIG. 16.

FIG. 19 illustrates the results of using the pair of light splitting optical films 810, 820 and the third optical film 1600 having the plurality of microstructures 1610. Similar to what was measured with the goniophotometer in FIG. 17, FIG. 19 illustrates the maintenance of the high angular spreading by the plurality of microstructures 1610 (quad pyramids), as compared to the volumetric diffuser results of FIG. 18.

Figure 20:
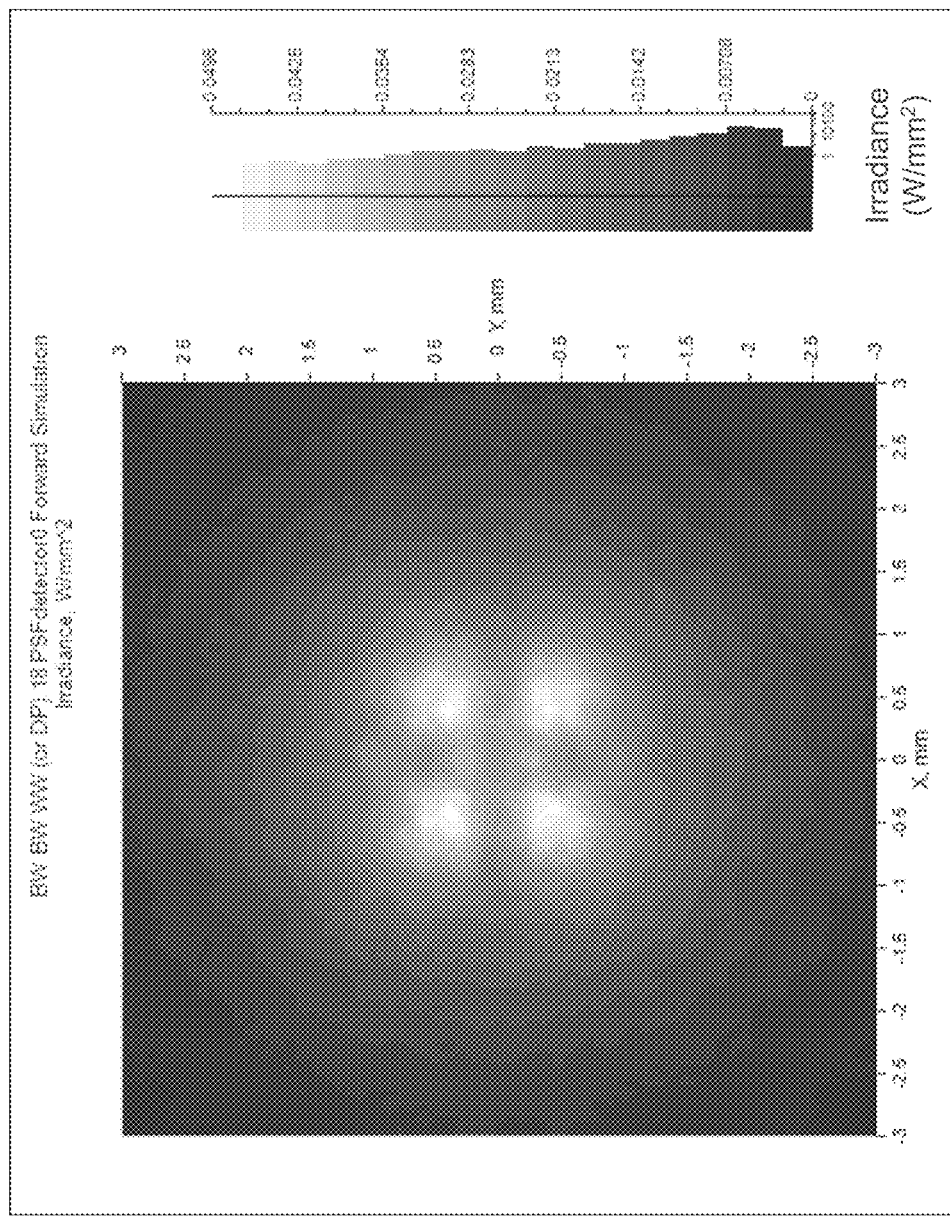
FIG. 20 is an output plot from the modelling program that shows an intensity of light from an LED light source as a function of position in two dimensions after the light has passed through another embodiment of two light splitting optical films having a high refractive index and the third optical film of FIG. 16.

FIG. 20 illustrates the modeling results when using two crossed prism films having a high refractive index similar to the pair of light splitting optical films 810, 820 described above, but without the plurality of random rough structures 814, 824, and the third optical film 1600 having the plurality of microstructures 1610. As defined herein, "high refractive index" means a refractive index of greater than 1.65, such as 1.7, for example. As illustrated, the crossed film with prisms without the random rough microstructures on one side thereof provide less uniformity than the pair of light splitting optical films 810, 820 that have the random rough microstructures 814, 824, which results in four distinct spots (FIG. 20) as compared to a larger single spot (FIG. 19).

EXAMPLES

In order to test the effects of different combinations of films in the back light unit 600, a series of combinations of optical films were used for the lower stack of optical films 620 and the upper stack of optical films 640, with the same color conversion layer 630 (a phosphor film) in between the lower stack of optical films 620 and the upper stack of optical films 640. The films used for the lower stack of optical films 620 and the upper stack of optical films 640 were a pair of light splitting optical films, each having a plurality of microstructures, and a pair of diffuser films in the form of volumetric diffusers. Four different combinations were used, as summarized in Table I below.

TABLE I

SUMMARY OF STACKS OF OPTICAL FILMS-EXAMPLES 1-4

| Example | Lower Stack of Optical Films | Color Conversion Layer | Upper Stack of Optical Films |
|---|---|---|---|
| 1 | 2 volumetric diffusers | phosphor film | 2 volumetric diffusers |
| 2 | 2 crossed light splitting optical films with microstructures | phosphor film | 2 volumetric diffusers |

TABLE I-continued

SUMMARY OF STACKS OF OPTICAL FILMS-EXAMPLES 1-4

| Example | Lower Stack of Optical Films | Color Conversion Layer | Upper Stack of Optical Films |
|---|---|---|---|
| 3 | 2 volumetric diffusers | phosphor film | 2 crossed light splitting optical films with microstructures |
| 4 | 2 crossed light splitting optical films with microstructures | phosphor film | 2 crossed light splitting optical films with microstructures |

Each Example 1-4 was placed on a light board that includes an array of mini LEDs having a spacing of 1.6 mm. When the pair of crossed (i.e., oriented 90° relative to each other) light splitting optical films were used in the upper stack of optical films, the pair of crossed light splitting optical films as a unit were turned about 20° clockwise relative to the array of mini LEDs. The total thickness of each stack, the relative mean energy emerging from the stack and the range/mean energy of each stack were measured. The results are summarized in Table II below.

TABLE II

SUMMARY OF TEST RESULTS-EXAMPLES 1-4

| Example | Total Thickness (mm) | Relative Mean Energy | Range/Mean Energy (%) |
|---|---|---|---|
| 1 | 0.969 | 38.9 | 6.3 |
| 2 | 0.899 | 39.2 | 5.9 |
| 3 | 0.879 | 75.8 | 2.4 |
| 4 | 0.809 | 77.1 | 1.2 |

A higher relative mean energy indicates brighter light exiting the back light unit 600, which is desirable, and a lower range/mean energy indicates more uniform light exiting the back light unit 600, which is also desirable. The test results show that the back light units 600 that included two crossed light splitting optical films in the upper stack of optical films 640 (Examples 3 and 4) had significantly greater mean energy exiting the stacks and significantly lower range/mean energy as compared to the back light units 600 that included two volumetric diffusers in the upper stack (Examples 1 and 2). Example 4, which had two crossed light splitting optical films in both the lower stack of optical films 620 and the upper stack of optical films 640 had the smallest thickness, the highest mean energy and the lowest range/mean energy, which is desirable.

Figure 21B:
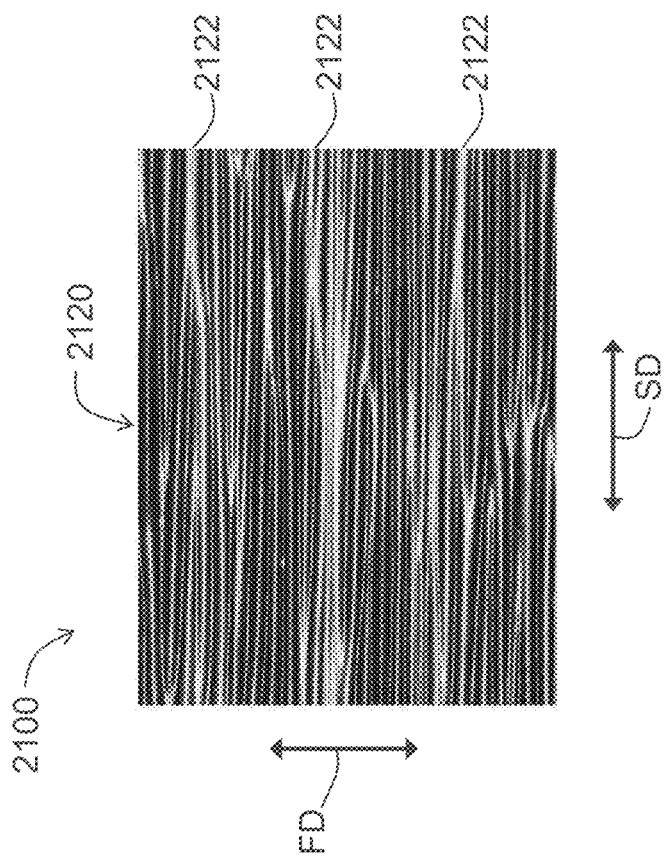
FIG. 21B is an enlarged photomicrograph of a portion of a second side of the light splitting optical film of FIG. 21A.
Figure 21A:
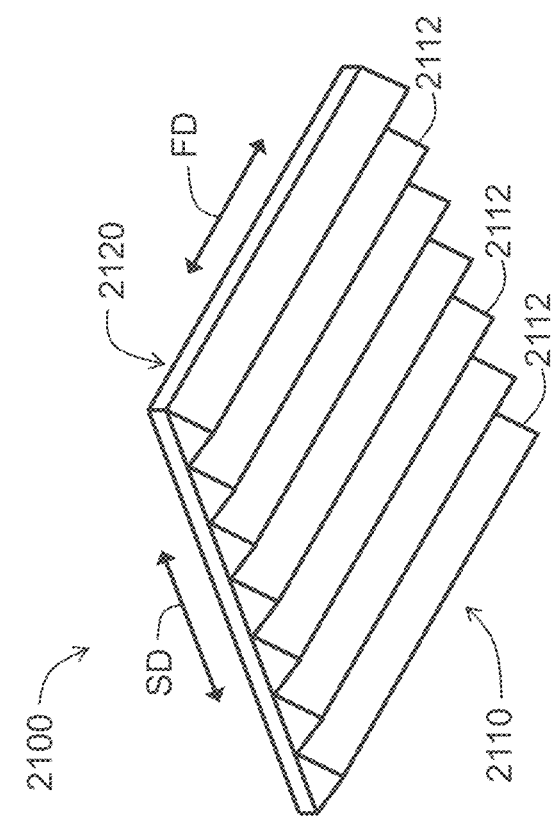
FIG. 21A is a schematic illustration of a first side of a light splitting optical film in accordance with an embodiment of the invention.
Figure 22C:
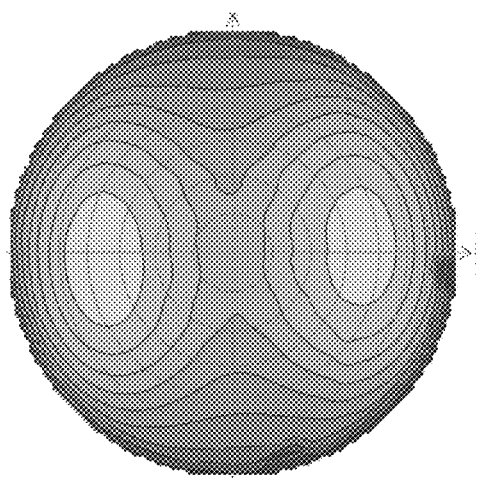
FIG. 22C a two-dimensional plot of a distribution of the light output from the LED source having the light distribution of FIG. 2A after the light has passed through a single light splitting optical film according to an embodiment of the invention, as measured by a goniophotometer.
Figure 22B:
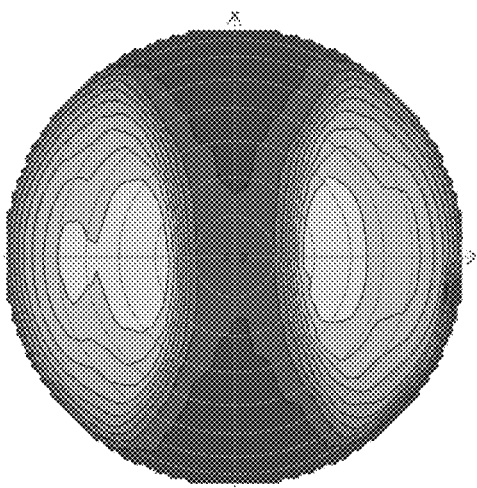
FIG. 22B a two-dimensional plot of a distribution of the light output from the LED source having the light distribution of FIG. 2A after the light has passed through a single light splitting optical film according to an embodiment of the invention, as measured by a goniophotometer.
Figure 22A:
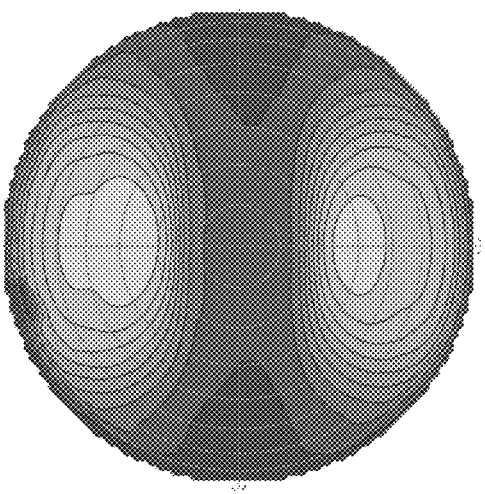
FIG. 22A a two-dimensional plot of a distribution of the light output from the LED source having the light distribution of FIG. 2A after the light has passed through a single light splitting optical film illustrated in FIGS. 21A and 21B, as measured by a goniophotometer.

Additional samples were made to investigate other combinations of films for the lower stack of films 620 in the back light unit 600, as well as a different spacing for the array 610 of light emitting diodes 612. For Example 5, a stack of three light splitting optical films was used for the lower stack of optical films 620. A light splitting optical film 2100 having the structures illustrated in FIGS. 21A and 21B and an overall thickness of about 0.11 mm was used as the first light splitting optical film 622. As illustrated, the light splitting optical film 2100 includes a plurality of parallel linear prisms 2112 extending in a first direction FD on a first side 2110 of the light splitting optical film 2100 (see FIG. 21A), and a plurality of elliptical lenticular microstructures 2122 having a 1° by 60° spread and extending in a second direction SD substantially orthogonal to the first direction FD were provided on a second side 2120 of the light splitting optical film 2100 (see FIG. 21B). The prims 2112 were made from a material having a refractive index of about 1.7. For the second light splitting optical film 624 for Example 5, the same light splitting optical film 2100 was used, but with an overall thickness of about 0.2 mm. The plurality of parallel linear prisms 2112 for each of the films were aligned substantially parallel to each other in the first direction FD, in contrast to the orientation illustrated in FIG. 8, and were oriented to face the array 610 of LEDs 612. FIG. 22A illustrates a two-dimensional plot of a distribution of light output from the LED 612 having a Lambertian distribution after the light has passed through the light splitting optical film 2100 of FIGS. 21A and 21B with the plurality of parallel linear prisms facing the LED 612. The lighter color indicates higher light intensity.

Example 5 also included a third light splitting optical film as the third optical film 626, which included a plurality of randomized conical microstructures on a first side facing the second light splitting optical film 624 and a plurality of parallel linear prisms on a second side of the third light splitting optical film 626, opposite the first side. The prisms were made from a material having an refractive index of 1.7 and the third light splitting optical film 626 had a thickness of 0.2 mm.

For Example 6, four light splitting optical films were used for the lower stack of optical films 620. The first light splitting optical film 622 for this embodiment had a plurality of linear prisms on a bottom side facing the array 610 of LEDs 612 and a plurality of circular light splitting microstructures on a top side of the first light splitting optical film 622. The first light splitting optical film 622 for this embodiment had a thickness of 0.17 mm and the prisms were made from a material having a refractive index of about 1.7. FIG. 22B illustrates a two-dimensional plot of a distribution of light output from the LED 612 having a Lambertian distribution after the light has passed through the first light splitting optical film of this embodiment, with the plurality of parallel linear prisms facing the LED 612. The lighter color indicates higher light intensity.

The second light splitting optical film 624 for this embodiment had a plurality of parallel linear prisms on a bottom side facing the array 610 of LEDs 612 and a plurality of randomized conical microstructures on a top side of the second light splitting optical film 624. The second light splitting optical film 624 for this embodiment had a thickness of 0.12 mm and the prisms were made from a material having a refractive index of about 1.7. FIG. 22C illustrates a two-dimensional plot of a distribution of light output from the LED 612 having a Lambertian distribution after the light has passed through the second light splitting optical film of this embodiment, with the plurality of parallel linear prisms facing the LED 612. The lighter color indicates higher light intensity.

The second light splitting optical film 624 was oriented relative to the first light splitting optical film 622 such that the plurality of parallel linear prisms of the second light splitting optical film 624 were substantially orthogonal to the plurality of parallel linear prisms of the first light splitting optical film 622, similar to what is illustrated in FIG. 8.

The third light splitting optical film 626 for this Example 6 embodiment had a plurality of circular light splitting microstructures on a bottom side facing the second light splitting optical film 624 and a plurality of parallel linear prisms on a top side of the third light splitting optical film 626. The film had a thickness of 0.11 mm and the prisms were made from a material having a refractive index of about 1.7. The plurality of parallel linear prisms of the third light splitting optical film were oriented to be parallel to the plurality of parallel linear prisms of the second light splitting optical film 624. The fourth light splitting optical film was the same as the third light splitting optical film 626, but with the plurality of parallel linear prisms oriented substantially orthogonal to the plurality of parallel linear prisms of the third light optical splitting film 626.

Also included in Examples 5 and 6 were a phosphor film having a thickness of 0.12 mm that was used for the color conversion layer 630 and located above the third light splitting optical film 626, and a pair of crossed brightness enhancement films 650, 660, each having a thickness of 0.1 mm, located above the color conversion layer 630. No upper stack of optical films 640 was used between the color conversion layer 630 and the pair of brightness enhancement films 650, 660. A summary of the light splitting optical films that were used for Examples 5 and 6 are summarized in Table III below.

TABLE III

SUMMARY OF LOWER STACKS OF OPTICAL FILMS-EXAMPLES 5 & 6

| Example | First Light Splitting Optical Film | Second Light Splitting Optical Film | Third Light Splitting Optical Film | Fourth Light Splitting Optical Film |
|---|---|---|---|---|
| 5 | Elliptical Lenticular Structures (top) Parallel Linear Prisms (bottom) | Elliptical Lenticular Structures (top) Parallel Linear Prisms (bottom) | Parallel Linear Prisms (top) Randomized Conical Microstructures (bottom) | None |
| 6 | Circular Light Splitting Microstructures (top) Parallel Linear Prisms (bottom) | Randomized Conical Microstructures (top) Parallel Linear Prisms (bottom) | Parallel Linear Prisms (top) Circular Light Splitting Microstructures (bottom) | Parallel Linear Prisms (top) Circular Light Splitting Microstructures (bottom) |

Each of Examples 5 and 6 was placed on a light board that includes an array of mini LEDs having a spacing of 2.4 mm. The total thickness of each stack (including the color conversion layer and brightness enhancement films), the relative mean energy emerging from the stack and the range/mean energy of each stack were measured. The results are summarized in Table IV below.

TABLE IV

SUMMARY OF TEST RESULTS-EXAMPLES 5 & 6

| Example | Total Thickness (mm) | Relative Mean Energy | Range/Mean Energy (%) |
|---|---|---|---|
| 5 | 0.83 | 69.6 | 2.3 |
| 6 | 0.83 | 68.9 | 3.6 |

The test results for Examples 5 and 6 show that the back light unit 600 that included three light splitting optical films in the lower stack of optical films 620 (Examples 5) had greater mean energy exiting the stack (greater brightness) and lower range/mean energy (greater uniformity) as compared to the back light unit 600 that included four light splitting optical films in the lower stack of optical films 620 (Example 6), even though the two lower stacks of optical films has the same thickness.

The test results indicate that it may be advantageous to use two or more light splitting optical films in the lower stack of optical films 620 having elliptical lenticular structures on top surfaces thereof and parallel linear prisms on bottom surfaces thereof, with the parallel linear prisms for the two films oriented substantially in the same direction, i.e. within 30 degrees or desirably within 15 degrees. Although the elliptical lenticular structures described above had a 1° by 60° spread, other shapes may be used. For example, according to embodiments of the invention, elliptical lenticular structures having spread of 1° by 40° or 1° by 90° may be used.

Figure 23:
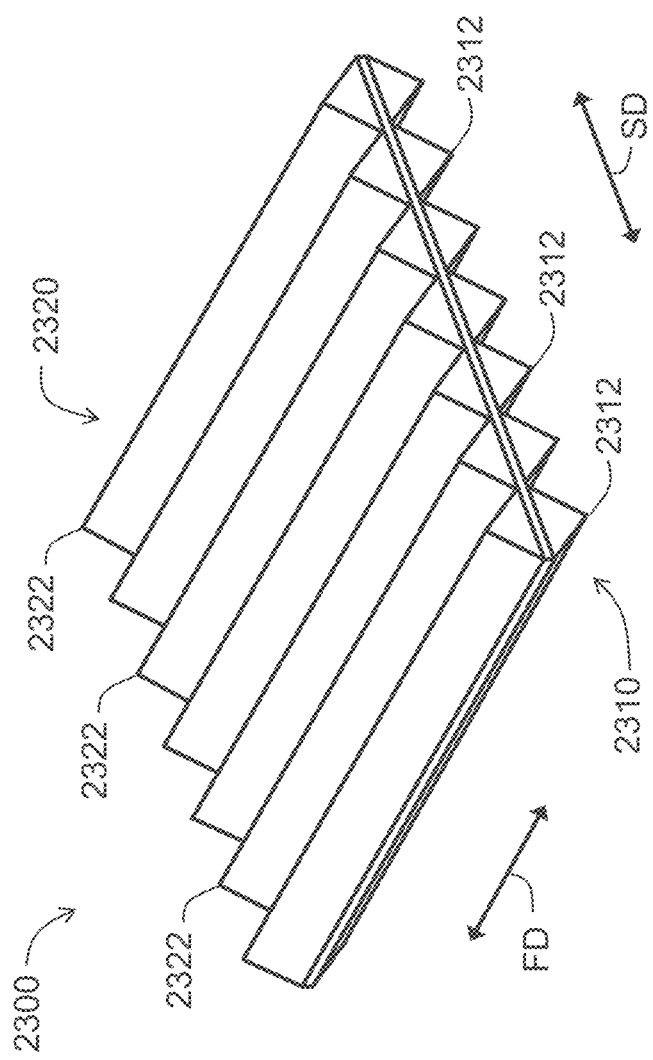
FIG. 23 is a schematic illustration of a light splitting optical film in accordance with an embodiment of the invention.

FIG. 23 schematically illustrates an embodiment of a light splitting optical film 2300 that may be used as one or more of the light splitting optical films 622, 624 in the lower stack of optical films 620 illustrated in FIGS. 6 and 7. As illustrated, the light splitting optical film 2300 includes a plurality of parallel linear prisms 2312 extending in a first direction FD on a first side 2310 of the light splitting optical film 2300, and a plurality of parallel linear prisms 2322 also extending in the first direction FD on a second side 2320 of the light splitting optical film 2300. In an embodiment, when two of the light splitting optical films 2300 are used as the first and second light splitting optical films 622, 624 of the lower stack of optical films 620, all of the parallel linear prisms 2312, 2322 of both films 2300 may be aligned in substantially the same direction, e.g., the first direction FD.

In an embodiment, when two of the light splitting optical films 2300 are used as the first and second light splitting optical films 622, 624 of the lower stack of optical films 620, one of the two light splitting optical films 2300 may be oriented so that the plurality of linear prisms 2312, 2322 of one film are aligned substantially orthogonal to the plurality of linear prisms 2312, 2322 of the other film. For example, one film 2300 may have its plurality of linear prisms 2312, 2322 aligned in the first direction FD, while the other film has its plurality of linear prisms 2312, 2322 aligned in a second direction SD, substantially orthogonal to the first direction FD.

In an embodiment, when two of the light splitting optical films 2300 are used as the first and second light splitting optical films 622, 624 of the lower stack of optical films 620, one of the two light splitting optical films 2300 may be oriented so that its plurality of linear prisms 2312, 2322 are aligned in the first direction FD, while the other film has its plurality of linear prisms 2312, 2322 aligned in any direction relative to the first direction FD, e.g., in a direction between the first direction FD and the second direction SD.

Figure 24:
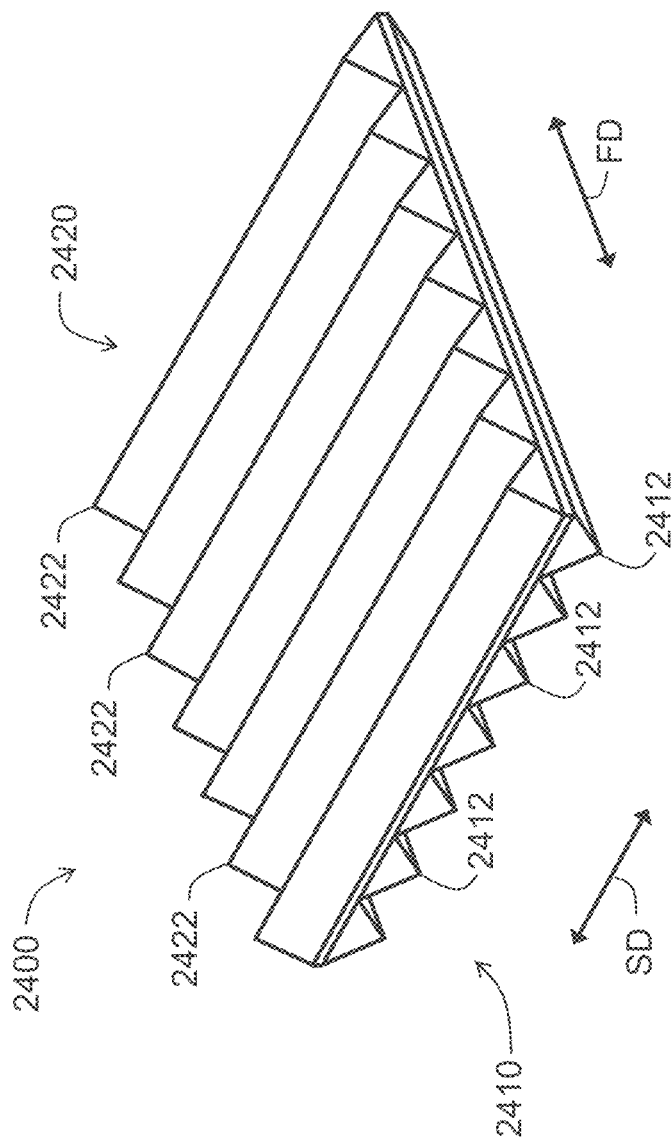
FIG. 24 is a schematic illustration of a light splitting optical film in accordance with an embodiment of the invention.

FIG. 24 schematically illustrates an embodiment of a light splitting optical film 2400 that may be used as one or more of the light splitting optical films 622, 624 in the lower stack of optical films 620 illustrated in FIGS. 6 and 7. As illustrated, the light splitting optical film 2400 includes a plurality of parallel linear prisms 2412 extending in a first direction FD on a first side 2410 of the light splitting optical film 2400, and a plurality of parallel linear prisms 2422 extending in a second direction SD, substantially orthogonal to the first direction FD, on a second side 2420 of the light splitting optical film 2400. In an embodiment, when two of the light splitting optical films 2400 are used as the first and second light splitting optical films 622, 624 of the lower stack of optical films 620, all of the parallel linear prisms 2412 of the first sides 2410 of the films 2400 may be aligned in substantially the same direction, e.g., the first direction FD.

In an embodiment, when two of the light splitting optical films 2400 are used as the first and second light splitting optical films 622, 624 of the lower stack of optical films 620, one of the two light splitting optical films 2400 may be oriented so that the plurality of linear prisms 2412 of its first side 2410 are aligned substantially orthogonal to the plurality of linear prisms 2412 of the first side 2410 of the other film 2400 such that one film has its plurality of linear prisms 2412 aligned in the first direction FD, while the other film has its plurality of linear prisms 2412 aligned in the second direction SD, substantially orthogonal to the first direction FD.

In an embodiment, when two of the light splitting optical films 2400 are used as the first and second light splitting optical films 622, 624 of the lower stack of optical films 620, one of the two light splitting optical films 2400 may be oriented so that its plurality of linear prisms 2412 of the first side 2410 are aligned in the first direction FD, while the other film has its plurality of linear prisms 2412 of the first side 2410 aligned in any direction relative to the first direction, e.g., in a direction between the first direction FD and the second direction SD.

Figure 25:
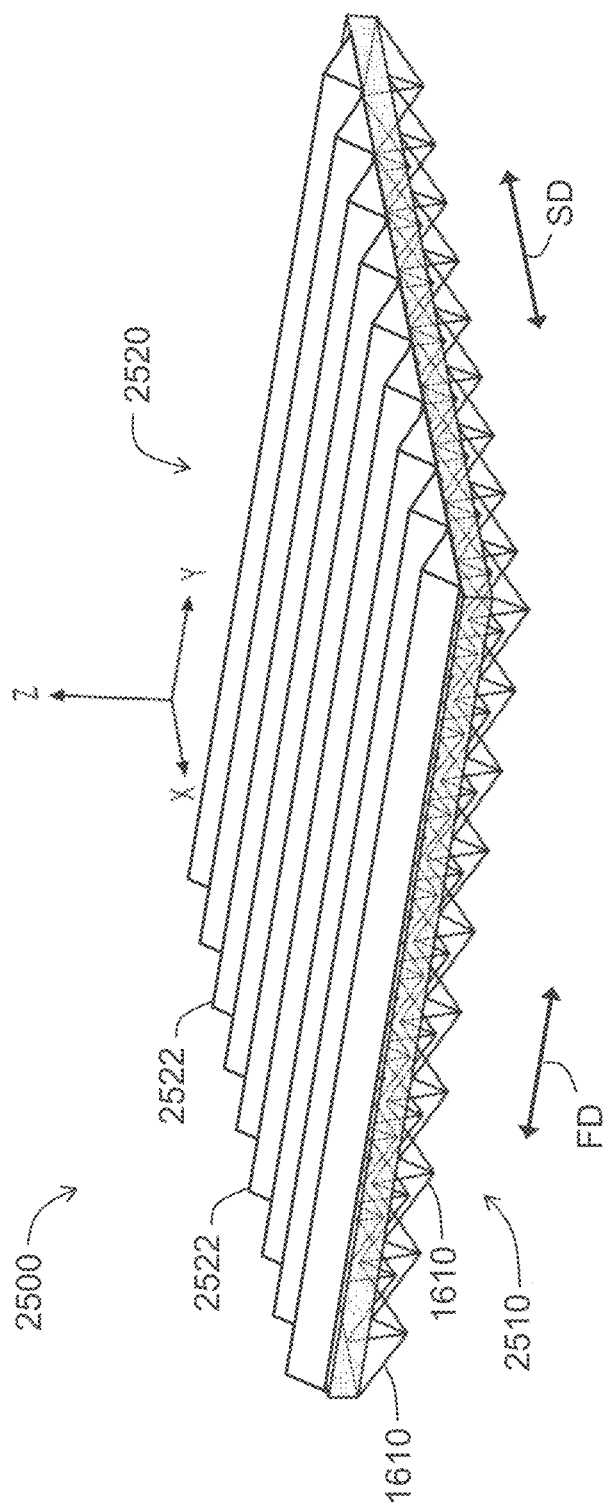
FIG. 25 is a schematic illustration of a light splitting optical film in accordance with an embodiment of the invention.

FIG. 25 schematically illustrates an embodiment of a light splitting optical film 2500 that may be used as one or more of the light splitting optical films 622, 624 in the lower stack of optical films 620 illustrated in FIGS. 6 and 7. As illustrated, the light splitting optical film 2500 includes the plurality of quad (four-sided) pyramids 1610 described above with respect to FIG. 16 on a first side 2510 of the light splitting optical film 2500, and a plurality of parallel linear prisms 2522 extending in a first direction FD on a second side 2520 of the light splitting optical film 2500. In an embodiment, when two of the light splitting optical films 2500 are used as the first and second light splitting optical films 622, 624 of the lower stack of optical films 620, all of the parallel linear prisms 2522 of the second sides 2520 of the films 2500 may be aligned in substantially the same direction, e.g., the first direction FD.

In an embodiment, when two of the light splitting optical films 2500 are used as the first and second light splitting optical films 622, 624 of the lower stack of optical films 620, one of the two light splitting optical films 2500 may be oriented so that the plurality of linear prisms 2522 of its second side 2520 are aligned substantially orthogonal to the plurality of linear prisms 2522 of the second side 2520 of the other film 2500 such that one film has its plurality of linear prisms 2522 aligned in the first direction FD, while the other film has its plurality of linear prisms 2522 aligned in the second direction SD, substantially orthogonal to the first direction FD.

In an embodiment, the third optical film 626 of the lower stack of optical films 620 of FIGS. 6 and 7 may also be the light splitting optical film 2500 of FIG. 25, with the plurality of linear prisms 2522 aligned in the first direction FD or the second direction SD.

The embodiments described herein represent a number of possible implementations and examples and are not intended to necessarily limit the present disclosure to any specific embodiments. Instead, various modifications can be made to these embodiments, and different combinations of various embodiments described herein may be used as part of the invention, even if not expressly described, as would be understood by one of ordinary skill in the art. For example, the light splitting optical films and the diffuser optical films may include different microstructures and different combinations of microstructures than the microstructures depicted in the drawings, such as, for example, the microstructures disclosed in International Patent Application Publication No. WO 2019/152382, the entire content of which is incorporated herein.

In addition, the upper stack of optical films 640 may include the same combination of films as the lower stack of optical films 620 or may include a different combination of films. In an embodiment, the majority of the films of the back light unit 600 that are located below the brightness enhancement films 650, 660 may have microstructures configured to split an incoming beam of light into two or more beams of light. In an embodiment, all or almost all of the optical films in the back light unit 600 may have microstructures configured to split an incoming beam of light into two or more beams of light on at least one surface thereof. The resulting brightness and uniformity of the light exiting the lower stack of optical films 620 may be adjusted by using different combinations of prisms and microstructures on the various optical films in the lower stack of optical films 620.

The illustrated and above-described embodiments are not intended to be limiting in any way, and any such modifications to the embodiments described herein are intended to be included within the spirit and scope of the present disclosure and protected by the claims that follow.

What is claimed is:

1. A back light unit comprising:
an array of light emitting diodes;
at least two optical films positioned above the array of light emitting diodes; and
at least one brightness enhancement film positioned above the at least two optical films;
wherein a majority of the at least two optical films are light splitting optical films having a plurality of light splitting microstructures on at least one surface thereof and at least one of the light splitting microstructures being formed in a shape of a pyramid.

2. The back light unit according to claim 1, wherein the at least one of the light splitting microstructures is formed in a shape of a four-sided pyramid.

3. The back light unit according to claim 2, wherein the at least one of the light splitting microstructures is formed in a shape of a three-sided pyramid.

4. The back light unit according to claim 2, wherein the at least one of the light splitting microstructures is formed in a shape of an inverted pyramid.

5. The back light unit according to claim 2, wherein all of the at least two optical films have the plurality of light splitting microstructures on at least one surface thereof.

6. The back light unit according to claim 2, further comprising a color conversion layer positioned above the array of light emitting diodes and below the at least one brightness enhancement film.

7. The back light unit according to claim 6, wherein the color conversion layer is positioned above at least one light splitting optical film.

8. The back light unit according to claim 7, wherein the color conversion layer has at least one surface comprising a plurality of light splitting microstructures.

9. The back light unit according to claim 7, further comprising at least one additional light splitting optical film positioned above the color conversion layer and below at least brightness enhancement film.

10. The back light unit according to claim 2, wherein the at least two optical films include a third light splitting optical film comprising a plurality of parallel linear prisms on a first side thereof.

11. The back light unit according to claim 10, wherein the third light splitting further comprises a plurality of microstructures on a second side thereof.

12. The back light unit according to claim 11, wherein the second side of the third light splitting optical film faces the second light splitting optical film.

13. The back light unit according to claim 10, wherein the third light splitting film comprises a plurality of microstructures on a first side facing the second light splitting optical film and a plurality of linear prisms on a second side of the third light splitting optical film, opposite the first side.

14. The back light unit according to claim 2, wherein at least one of the at least two optical films comprise film microstructures facing away from the light emitting diode.

15. The back light unit according to claim 2, wherein at least one of the at least two optical films comprise a plurality of microstructures on a first side facing a plurality of microstructures on the other one of the at least two optical films.

16. The back light unit according to claim 2, wherein at least one of the least two optical films comprises a plurality of first parallel linear prisms extending in the first direction on a first side thereof and a plurality of second parallel linear prisms extending in the first direction on a second side thereof.

17. The back light unit according to claim 16, wherein at least one of the at least two optical films comprise a plurality of first parallel linear prisms extending in a second direction, substantially orthogonal to the first direction, on a first side thereof and a plurality of second parallel linear prisms on a second side thereof.

18. The back light unit according to claim 2, wherein the at least two optical films comprise three light splitting optical films, each light splitting optical film comprising a plurality of microstructures on a first side thereof and a plurality of parallel linear prisms extending in a first direction on a second side thereof, wherein each microstructure has a shape of a quad pyramid.

19. The back light unit according to claim 2, wherein the at least one brightness enhancement film positioned above the at least two optical films comprise a pair of brightness enhancement films.

20. A back light unit comprising:
an array of light emitting diodes;
at least two optical films positioned above the array of light emitting diodes; and
at least one brightness enhancement film positioned above the at least two optical films;
wherein the at least two optical films comprise a first light splitting optical film comprising a plurality of first parallel linear prisms extending in a first direction on a first side thereof and a plurality of first elliptical lenticular structures extending in a second direction on a second side thereof, the second direction being substantially orthogonal to the first direction, wherein the first side faces the array of light emitting diodes.

21. A back light unit comprising:
an array of light emitting diodes;
at least two optical films positioned above the array of light emitting diodes; and
at least one brightness enhancement film positioned above the at least two optical films;
wherein the at least two optical films includes a first light splitting optical film and a second light splitting optical film that is positioned above the first light splitting optical film, the second light splitting optical film comprising a plurality of parallel linear prisms extending substantially in a first direction on a first side thereof and a plurality of elliptical lenticular structures extending in the second direction on a second side thereof.

22. A back light unit comprising:
an array of light emitting diodes;
at least two optical films positioned above the array of light emitting diodes; and
at least one brightness enhancement film positioned above the at least two optical films;
wherein at least one of the at least two optical films is a first light splitting optical film comprising a plurality of first parallel linear prisms extending in a first direction on a first side thereof and a plurality of second parallel linear prisms extending in a second direction, substantially orthogonal to the first direction, on a second side thereof.

* * * * *